(12) United States Patent
Diaz

(10) Patent No.: US 11,282,491 B2
(45) Date of Patent: Mar. 22, 2022

(54) PLATES AND PLATE ASSEMBLIES FOR NOISE ATTENUATORS AND OTHER DEVICES AND METHODS MAKING THE SAME

(71) Applicant: Emerson Process Management Regulator Technologies, Inc., McKinney, TX (US)

(72) Inventor: Juan Manuel Diaz, Melissa, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 76 days.

(21) Appl. No.: 16/717,414

(22) Filed: Dec. 17, 2019

(65) Prior Publication Data

US 2021/0183347 A1    Jun. 17, 2021

(51) Int. Cl.
*G10K 11/16* (2006.01)
*F15D 1/02* (2006.01)
(Continued)

(52) U.S. Cl.
CPC ............ *G10K 11/161* (2013.01); *F15D 1/025* (2013.01); *F16L 55/02718* (2013.01); *B33Y 99/00* (2014.12)

(58) Field of Classification Search
CPC .. G10K 11/161; F15D 1/025; F16L 55/02718; B33Y 99/00
(Continued)

(56) References Cited

U.S. PATENT DOCUMENTS 3,572,391 A    3/1971 Hirsch
4,062,524 A  * 12/1977 Brauner ................ B01F 5/0619
                                                  366/340
(Continued)

FOREIGN PATENT DOCUMENTS

CN        107485940      12/2017
CN        107930288      4/2018
(Continued)

OTHER PUBLICATIONS

International Searching Authority, "International Search Report and Written Opinion," in connection with Application No. PCT/US2020/065137, dated May 10, 2021, 22 pages.

(Continued)

*Primary Examiner* — Craig M Schneider
*Assistant Examiner* — David R Deal
(74) *Attorney, Agent, or Firm* — Hanley, Flight & Zimmerman, LLC

(57) ABSTRACT

Plates and plate assemblies for noise attenuators and other devices and methods of making the same are described herein. An example disc-shaped plate described herein includes a plurality of sector-shaped plates that have openings defining flow paths. Each of the plurality of sector-shaped plates has a first radial edge forming a first mating feature and a second radial edge forming a second mating feature that is complementary to the first mating feature such that, when the plurality of sector-shaped plates are arranged together, the first mating feature of each of the plurality of sector-shaped plates mates with the second mating feature of an adjacent one of the plurality of sector-shaped plates.

20 Claims, 26 Drawing Sheets

(51) Int. Cl.
*F16L 55/027* (2006.01)
*B33Y 99/00* (2015.01)

(58) Field of Classification Search
USPC .......................................................... 138/37
See application file for complete search history.

(56) References Cited

U.S. PATENT DOCUMENTS

| | | | | |
|---|---|---|---|---|
| 5,944,419 | A * | 8/1999 | Streiff | B01F 5/0641 366/337 |
| 6,152,182 | A * | 11/2000 | Grether | E03C 1/08 138/37 |
| 6,273,141 | B1 * | 8/2001 | DeSellem | F16K 1/221 138/37 |
| 8,295,692 | B2 * | 10/2012 | McClanahan | F28F 9/22 392/491 |
| 8,307,943 | B2 * | 11/2012 | Klasing | F02K 3/075 181/210 |
| 8,950,436 | B2 * | 2/2015 | Chalupa | G01F 1/6842 138/45 |
| 10,207,224 | B2 * | 2/2019 | Takahashi | F15B 21/14 |
| 10,300,447 | B2 * | 5/2019 | Palmer | B01J 8/0214 |
| 2012/0006615 | A1 | 1/2012 | Klasing et al. | |
| 2013/0061969 | A1 * | 3/2013 | Koike | B01D 46/10 138/37 |
| 2017/0205015 | A1 * | 7/2017 | Tecson | G10K 11/161 |
| 2018/0187816 | A1 * | 7/2018 | Masias | F16L 55/02718 |

FOREIGN PATENT DOCUMENTS

| | | |
|---|---|---|
| DE | 2251021 | 5/1974 |
| JP | 2007038215 | 2/2007 |
| WO | 2017123892 | 7/2017 |
| WO | 2018197757 | 11/2018 |

OTHER PUBLICATIONS

International Searching Authority, "International Search Report and Written Opinion," in connection with Application No. PCT/US2020/065135, dated May 10, 2021, 25 pages.

International Searching Authority, "Invitation to Pay Additional Fees and Partial International Search Report," in connection with Application No. PCT/US2020/065135, dated Mar. 15, 2021, 8 pages.

International Searching Authority, "Invitation to Pay Additional Fees and Partial International Search Report," in connection with Application No. PCT/US2020/065137, dated Mar. 16, 2021, 7 pages.

* cited by examiner

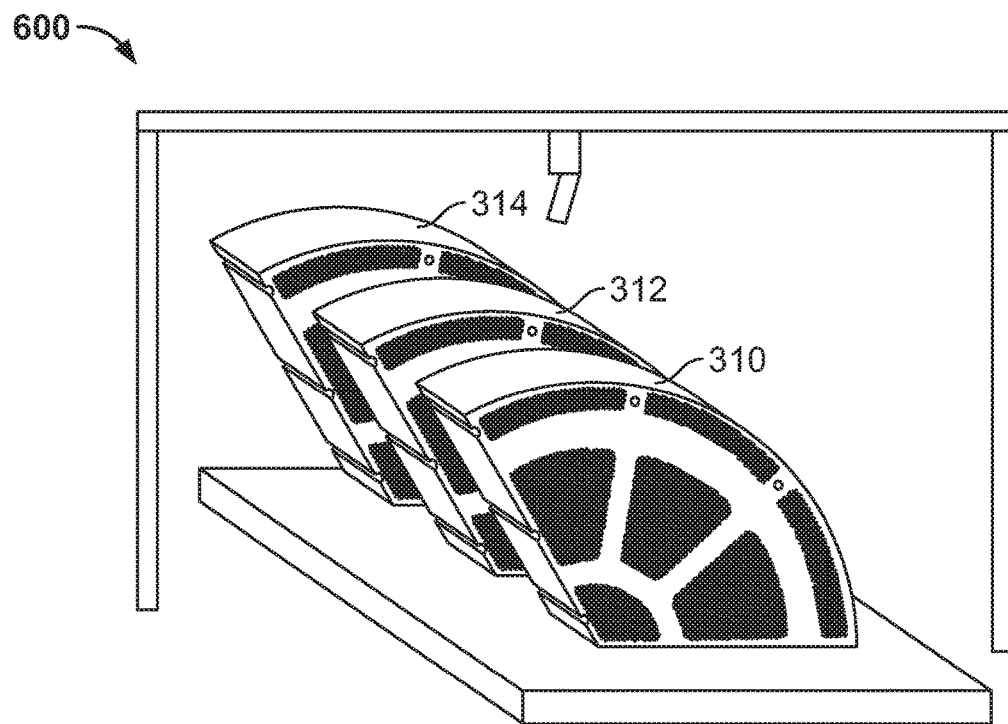
FIG. 6
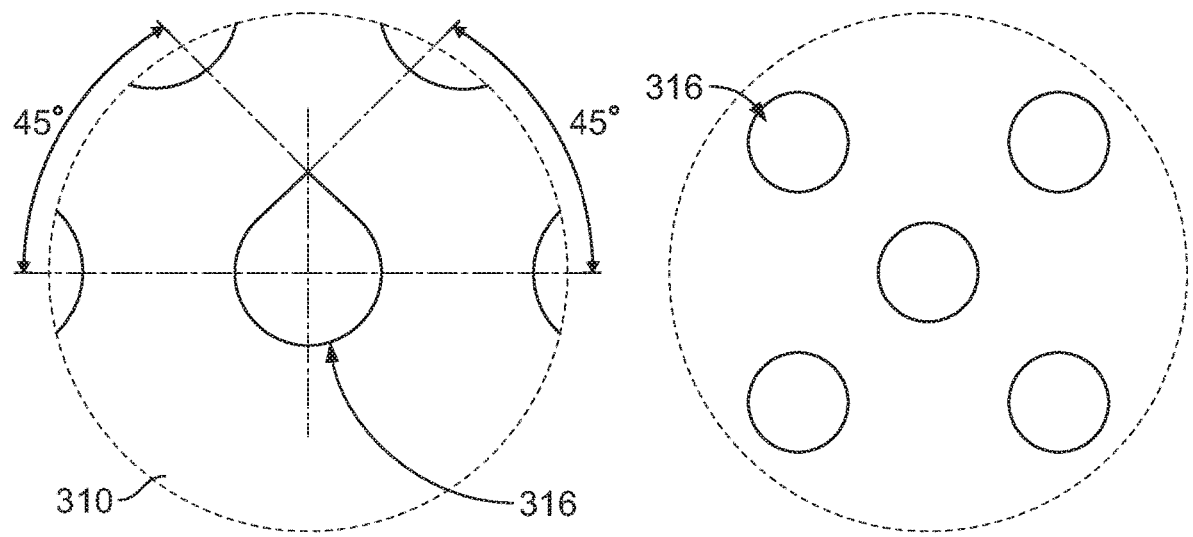
FIG. 7A
FIG. 7B

1600

1602
PRINT, VIA A 3D PRINTER, A PLURALITY OF SECTOR-SHAPED PLATES

1604
COUPLE THE PLURALITY OF SECTOR-SHAPED PLATES TO A SUPPORT FRAME

1606
COUPLE THE SUPPORT FRAME TO A FLUID BODY SUCH THAT A DISC-SHAPED PLATE FORMED BY THE PLURALITY OF SECTOR-SHAPED PLATES IS DISPOSED IN A FLUID PASSAGEWAY OF THE FLUID BODY

FIG. 16

US 11,282,491 B2

PLATES AND PLATE ASSEMBLIES FOR NOISE ATTENUATORS AND OTHER DEVICES AND METHODS MAKING THE SAME

FIELD OF THE DISCLOSURE

This disclosure relates generally to noise attenuators, and, more particularly, to plates and plate assemblies for noise attenuators and other devices and methods of making the same.

BACKGROUND

Fluid valves, regulators, and other process control devices are commonly distributed throughout process control systems and/or fluid distribution systems to control flow rates and/or pressures of various fluids (e.g., liquids, gases, etc.). Process control devices may be used to change a characteristic of a fluid such as a pressure, a temperature, a flow rate, etc. This change in a characteristic of the fluid often causes a significant amount of audible noise. For instance, fluid regulators are typically used to reduce and/or regulate a pressure of fluid to a predetermined value. Some fluid regulators reduce an inlet pressure to a lower outlet pressure by restricting flow through an orifice to match a downstream demand. However, fluid flowing through the pressure regulators creates a significant amount of audible noise. Therefore, noise attenuators are often coupled to the outlets of pressure regulators. Known noise attenuators include a series of plates with small openings that form flow channels through the plates.

SUMMARY

A plate assembly for a noise attenuator disclosed herein includes a support frame to be coupled to a body of the noise attenuator. The support frame has a plurality of radially extending ribs. The plate assembly also includes a disc-shaped plate having a plurality of openings forming flow paths to attenuate noise. The disc-shaped plate is coupled to the support frame such that pressure-induced loads on the disc-shaped plate are distributed to the plurality of radially extending ribs of the support frame.

A noise attenuator disclosed herein includes a body defining a fluid passageway between an inlet and an outlet and a plate assembly coupled to the body. The plate assembly includes a disc-shaped plate disposed in the fluid passageway. The disc-shaped plate has a plurality of openings forming flow paths. The plate assembly also includes a support frame disposed downstream of the disc-shaped plate such that pressure-induced loads on the disc-shaped plate are distributed to the support frame.

A method disclosed herein includes printing, via a three-dimensional (3D) printer, a plurality of sector-shaped plates. The plurality of sector-shaped plates have a plurality of openings forming flow paths. The plurality of sector-shaped plates, when arranged together, form a disc-shaped plate to be disposed in a fluid body to affect a flow of fluid through the fluid body.

A disc-shaped plate for a noise attenuator disclosed herein includes a plurality of sector-shaped plates. The plurality of sector-shaped plates have openings defining flow paths. Each of the plurality of sector-shaped plates has a first radial edge forming a first mating feature and a second radial edge forming a second mating feature that is complementary to the first mating feature such that, when the plurality of sector-shaped plates are arranged together, the first mating feature of each of the plurality of sector-shaped plates mates with the second mating feature of an adjacent one of the plurality of sector-shaped plates.

A noise attenuator disclosed herein includes a body defining a fluid passageway between an inlet and an outlet and a disc-shaped plate disposed in the fluid passageway. The disc-shaped plate has a plurality of openings forming flow paths for reducing noise of fluid flowing in the fluid passageway. The disc-shaped plate is formed by a plurality of sector-shaped plates having mating features such that, when the plurality of sector-shaped plates are arranged together, a portion of each of the plurality of sector-shaped plates overlaps in an axial direction with an adjacent one of the plurality of sector-shaped plates.

A method disclosed herein includes printing, via a three-dimensional (3D) printer, a plurality of sector-shaped plates. The plurality of sector-shaped plates have openings defining flow paths. Each of the plurality of sector-shaped plates has a first radial edge forming a first mating feature and a second radial edge forming a second mating feature that is complementary to the first mating feature.

BRIEF DESCRIPTION OF THE DRAWINGS

FIG. 6 shows an example three-dimensional (3D) printer that may be used to print the sector-shaped plates of FIG. 3.

FIG. 7A is an enlarged view of an example opening that may be formed in one of the example sector-shaped plates by the 3D printer of FIG. 6.

FIG. 7B is an enlarged view of another example opening that may be formed in one of the example sector-shaped plates by the 3D printer of FIG. 6.

FIG. 16 is a flowchart representative of an example method of manufacturing an example disc-shaped plate and installing the example disc-shaped plate in a fluid body.

Figure 1:
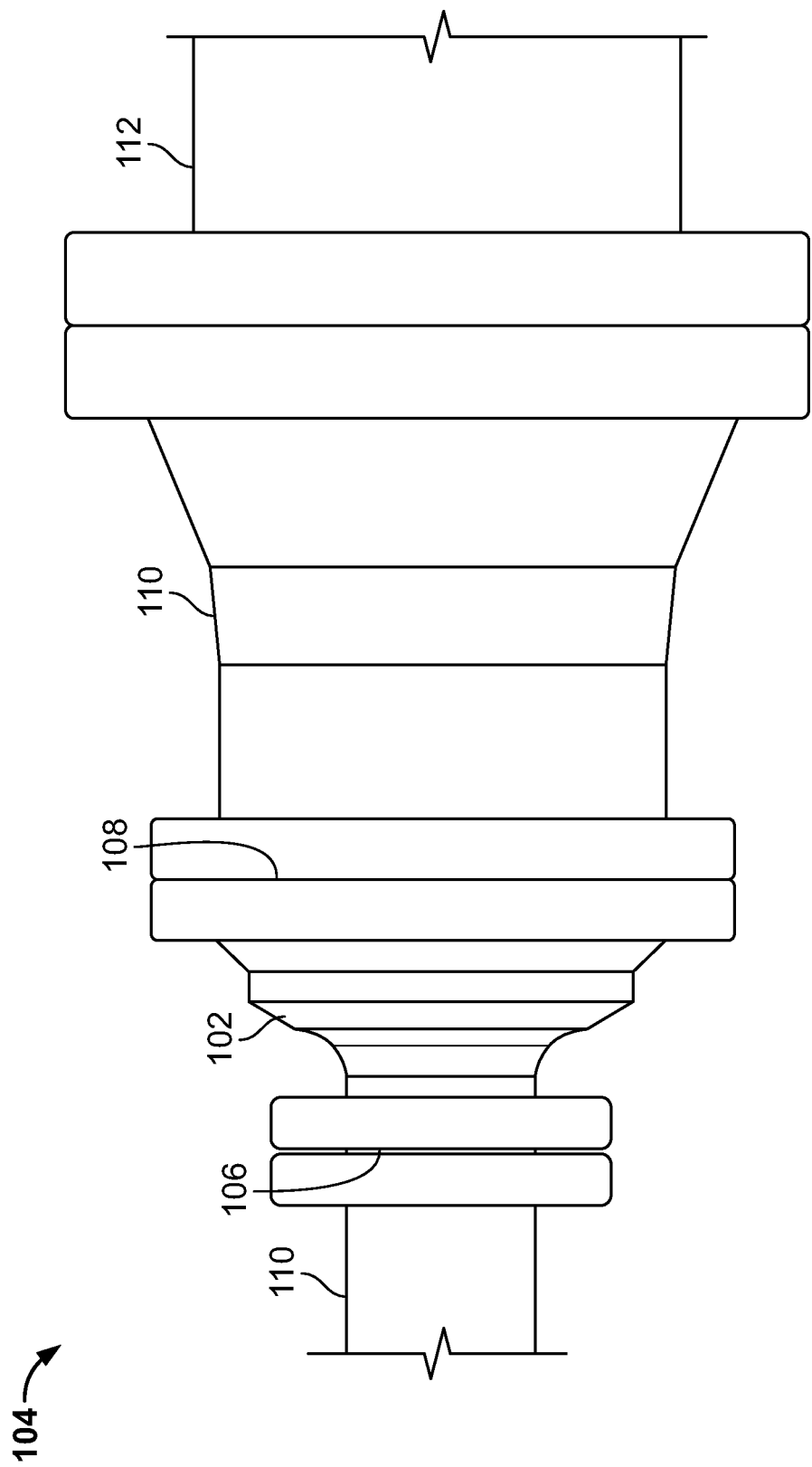
FIG. 1 is a side view of an example regulator assembly including an example noise attenuator in which example plates and example plate assemblies disclosed herein may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Many known process control and/or fluid distribution systems (e.g., power generation systems, petroleum refinery systems, natural gas distribution plants, fuel storage tanks, etc.) employ process control devices or field devices to affect the flow of fluid. For example, pressure regulators are used to control flow rates and/or pressures of various fluids (e.g., liquids, gases, etc.). Known pressure regulators include an inlet that receives fluid from a source at a relatively high pressure and an outlet that provides fluid to downstream equipment at a relatively lower pressure than that of the inlet. The inlet pressure of some known pressure regulators is reduced to a lower outlet pressure by restricting flow through an orifice to match a downstream demand. For example, known pressure regulators of process control and/or fluid distribution systems receive fluid (e.g., gas, liquid) having a relatively high and somewhat variable pressure from an upstream source and regulate the fluid flow to reduce and/or stabilize the pressure to a level suitable for use by downstream equipment (e.g., equipment of a power generator, a petroleum refiner, etc.).

In some instances, process control devices affect the flow of fluid in a manner that creates audible noise. For example, pressure regulators produce a substantial decrease in pressure or flow rate of the fluid, which, in turn, creates a significant amount of audible noise (e.g., greater than about 85 decibels). Fluid valves are also known to produce a significant amount of audible noise. Therefore, these process control devices may employ noise attenuators or noise-reduction devices to reduce the level of audible noise created by the fluid flowing through the process control device.

Example noise attenuators are disclosed herein. Noise attenuators include one or more plates or discs disposed in a fluid passageway to induce pressure drops along a flow path through the fluid passageway. The plates include openings (e.g., holes, apertures) that define fluid flow paths through the plates and, thus, through the fluid passageway. As the fluid passes through the plates, the pressure of the fluid is incrementally reduced (e.g., by a discrete amount, by a percentage of the previous fluid pressure) along a flow path. The pressure drops induced by the plates result in a corresponding reduction or attenuation of noise (e.g., by a discrete decibel level, by a percentage of the decibel level otherwise produced by the pressure regulator).

In some instances, these noise attenuators plates are exposed to significant pressure drops across each plate, which can produce relatively high forces on the plates. Such forces on the plates can create high bending stresses that cause the plates to yield. For example, the forces on the plates can cause portions of the plates to bend, deflect, rotate and/or otherwise move away from a wall of the fluid passageway (e.g., in a downstream direction), thereby reducing an amount of noise attenuation provided by the plates.

Therefore, some known plates are relatively thick to withstand the structural loading demands caused by the pressure drops. However, these known thick plates are difficult and costly to manufacture because known thick plates are often machined from large, thick sheets of metal that are cut into the individual plates and drilled (perforated). Further, these known thick plates add significant weight to the noise attenuator, which can complicate transportation, assembly, and installation. Other known plates utilize a central rod that connects to and supports centers of the plates. However, this type of support is susceptible to bending around the peripheral portions of the plate (sometimes referred to as a taco effect). Therefore, the plates still need to be relatively thick to withstand these forces without exhibiting any significant bending. Moreover, conventional machining operations used to produce these known plates are limited in feature density (e.g., the number and size of flow paths that can be formed in a plate in a given area).

Disclosed herein are example plate assemblies that include a thin disc-shaped plate and a support frame for supporting and providing rigidity to the disc-shaped plate. The disc-shaped plate may be coupled (e.g., via one or more threaded fasteners) to the support frame, and the support frame is coupled (e.g., via one or more threaded fasteners) to a body of the attenuator such that the disc-shaped plate is disposed in the fluid passageway of the attenuator body. The support frame is disposed downstream of the disc-shaped plat such that pressure-induced loads on the disc-shaped plate are distributed to the support frame. As such, the support frame prevents or reduces yielding of the disc-shaped plate caused by the pressure drop across the disc-shaped plate. The support frame may be constructed of steel or aluminum, for example. The support frame may include one or more structural members (e.g., ribs, rings, etc.) that provide a relatively large contact area for supporting the disc-shaped plate while still allowing fluid to flow freely through the support frame. As such, the disc-shaped plate can be relatively thin. From an acoustic standpoint, thin plates and thick plates perform similarly. However, from a flow perspective, thin plates produce less frictional losses than thick plates. Further, thin plates are easier and less expensive to manufacture.

In some examples disclosed herein, the disc-shaped plate is constructed via an additive manufacturing process, sometimes referred to as three-dimensional (3D) printing. As used herein, additive manufacturing or 3D printing refers to a manufacturing process that builds a 3D object by adding successive adjacent layers of material. The layers fuse together (e.g., naturally or via a subsequent fusing process) to form the 3D object. The material may be any material, such as plastic, metal, concrete, etc. Examples of additive manufacturing include Stereolithography (SLA), Selective Laser Sintering (SLS), fused deposition modeling (FDM), and multi jet modeling (MJM). 3D printing is advantageous because it results in less wasted material than known machining operations. Therefore, 3D printing the disc-shaped plate results in a relatively lower cost noise attenuator. Further, 3D printing is advantageous because it can be used to form high density features, such as thousands of smaller diameter openings (flow paths) in the plate, which may not be feasible with known machining processes. Smaller diameter openings create noise in higher acoustic frequencies than larger diameter openings. Human hearing is in the range of 20-20,000 hertz (Hz). Therefore, using smaller diameter openings tends to up-shift the noise frequency to frequencies that are less audible or not audible at all to the human ear.

In some examples, the size of the disc-shaped plate may exceed the printing capabilities of a 3D printer. In particular, the diameter of the disc-shaped plate may be larger than the footprint or building platform of the 3D printer. Therefore, in some examples disclosed herein, the disc-shaped plate is formed by a plurality of sections, such as sectors or angular sections. For example, the disc-shaped plate may be formed by a plurality of sector-shaped plates. Each of the sector-shaped plates may account for a sector of a circle. For example, the disc-shaped plate may be formed by four sector-shaped plates, each forming 90° (i.e., one quarter) of a circle. When the sector-shaped plates are arranged together, the sector-shaped plates form a full circle that defines the disc-shaped plate. In other examples the disc-shaped plate may be divided into more or fewer sector-shaped plates. In some examples, multiple ones of the sector-shaped plates are printed simultaneously during the same print batch. In some examples, each of the sector-shaped plates is printed in a vertical orientation, such that multiple sector-shaped plates can be printed side-by-side during the same print batch. After the sector-shaped plates are constructed, the sector-shaped plates may be coupled to the support frame to form the disc-shaped plate. Using the support frame enables the disc-shaped plate to be formed by one or more sections. In others examples, the disc-shaped plate may be manufactured by conventional machining means (e.g., perforated sheet metal, machined plates, stacked sheet metal, etc.) as a single piece or a plurality of sections.

Also disclosed herein are example disc-shaped plates formed by a plurality of sector-shaped plates that do not utilize support structures (e.g., a support frame) or fasteners (e.g., threaded fasteners). The sector-shaped plates may be arranged together to form a disc-shaped plate that can be disposed in a passageway of a fluid body, such as a noise attenuator body. The disc-shaped plate may be divided into any number of sector-shaped plates (e.g., two, three, four, five, etc.). Each of the sector-shaped plates has a first radial edge forming a first mating feature and a second radial edge forming a second mating feature that is complementary to the first mating feature. When the sector-shaped plates are arranged together, the first mating feature of each of the sector-shaped plates engages or mates with the second mating feature of an adjacent one of the sector-shaped plates. As such, at least a portion of each of the sector-shaped plates overlaps in an axial direction with an adjacent one of the sector-shaped plates. These mating features function to interlock the sector-shaped plates to reduce or prevent bending or axial displacement of the sector-shaped plates under pressure from the fluid flow. These mating features may be designed to prevent axial displacement in the upstream direction, downstream direction, or both. Various differently shaped mating features are disclosed herein.

Once the sector-shaped plates are combined into the disc-shaped plate, the disc-shaped plate may be installed in an attenuator body. In some examples, the outer peripheral region of the disc-shaped plate is clamped between two structures (e.g., an outlet flange of the attenuator body and an inlet flange of a downstream pipe), such that the disc-shaped plate fills or covers the fluid passageway. This clamping prevents radial and axial movement, and the interlocking mating features prevent bending and axial movement of the sector-shaped plates in the fluid passageway. Therefore, no support frames or fasteners are required. This greatly reduces manufacturing costs and assembly time as well as removal or disassembly time.

In some examples, the sector-shaped plates are constructed via 3D printing. In some examples, multiple ones of the sector-shaped plates are printed simultaneously during the same print batch. In some examples, each of the sector-shaped plates is printed in a vertical orientation, such that multiple sector-shaped plates can be printed side-by-side during the same print batch. As disclosed above, 3D printing is advantageous because of the minimal material waste, and because of the high feature density (e.g., thousands of small openings) that can be formed. Further, 3D printing is advantageous to form the mating features on the radial edges, which can be difficult with traditional (subtractive) machining operations. 3D printing may also be used to form complex structures, such as internal lattice structures, within the sector-shaped plates. However, in other examples, the sector-shaped plates may be constructed via traditional (subtractive) machining operations.

While many of the example plates and plate assemblies disclosed herein are described in connection with noise attenuators, it is understood that the example plates and plate assemblies can be used in other devices that that utilize multi-path flow plates. For example, flame arrestors similarly use one or more plates with small openings to allow fluid flow in one direction but prevent or reduce flame flow in the opposite direction. Any of the examples disclosed herein can also be utilized as a flame arrestor plate.

Turning to the figures, FIG. 1 illustrates an example noise attenuator 100 in which the example plates and/or plate assemblies disclosed herein may be implemented. The example noise attenuator 100 may be used to reduce noise levels in a process control system and/or fluid distribution system. The example noise attenuator 100 may be coupled to, for example, an outlet of a process control device to reduce the noise created by the flow of fluid exiting the process control device.

In the illustrated example of FIG. 1, the noise attenuator 100 is coupled to a fluid regulator 102 (e.g., a pressure regulator) as part of a fluid regulator assembly 104. However, in other examples, the noise attenuator 100 may be coupled to and/or otherwise integrated with any other type of process control device (e.g., a valve) and/or any other device that changes a characteristic of a fluid and creates noise. In the illustrated example, the fluid regulator assembly 104 is to process a fluid (e.g., natural gas, air, propane, nitrogen, hydrogen, carbon dioxide, etc.) through a passageway of the fluid regulator 102 between a regulator inlet 106 and a regulator outlet 108. In this example, the regulator inlet 106 receives fluid from an upstream pipe 110. The regulator 102 receives the fluid at a relatively high pressure (e.g., a few hundred pounds-per-square-inch (psi), between approximately 1200 psi and 1800 psi, etc.) at the regulator inlet 106 and reduces the pressure of the fluid at the regulator outlet 108 (e.g., down to about 10 psi, a few hundred psi, to a pressure that is just below the inlet pressure, etc.) based on a predetermined or preset setting. Due to relatively large pressure drops of the fluid as the fluid flows between the regulator inlet 106 and the regulator outlet 108 and/or relatively high velocity fluid flow rate of the fluid exiting the regulator outlet 108, the fluid may generate unacceptable noise levels (e.g., greater than 85 decibels).

The example noise attenuator 100 is in fluid communication with the regulator outlet 108 and reduces the noise levels produced by the fluid regulator 102 to an acceptable level (e.g., lower than 85 decibels). In this example, the noise attenuator 100 is coupled directly to the regulator outlet 108. However, in other examples, a pipe may be disposed between the regulator outlet 108 and the noise attenuator 100. The fluid exits the regulator outlet 108 and flows through the noise attenuator 100. The noise attenuator 100 is coupled to a downstream pipe 112, which transfers the fluid to a downstream location.

Figure 2:
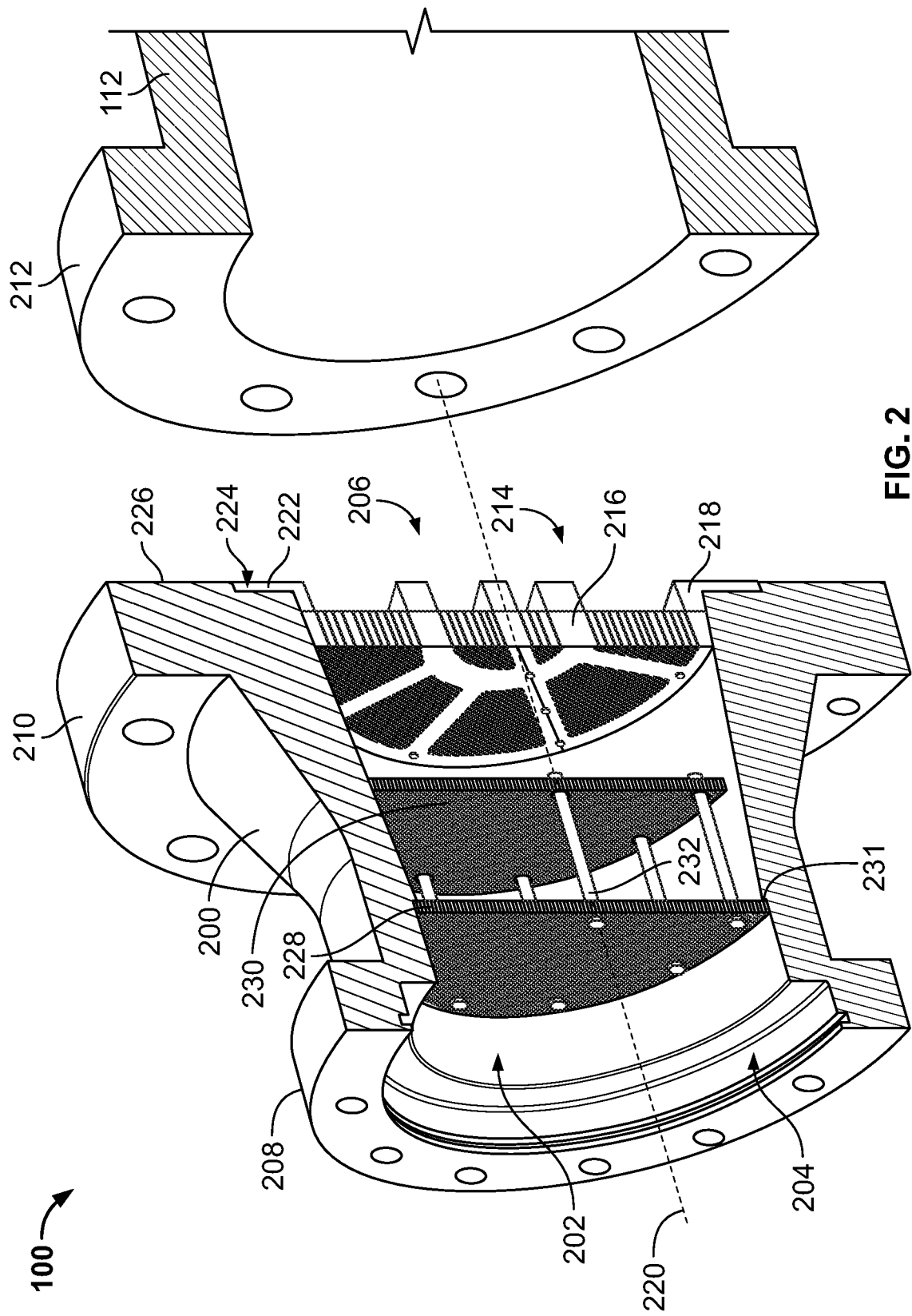
FIG. 2 is a perspective cross-sectional view of the example noise attenuator of FIG. 1 including an example plate assembly.

FIG. 2 is a perspective cross-sectional view of the example noise attenuator 100. In the illustrated example, the noise attenuator 100 includes a fluid body 200 defining a fluid passageway 202 between an inlet 204 and an outlet 206. The body 200 has an inlet flange 208 at the inlet 204 to be coupled (e.g., via threaded fasteners) to the regulator outlet 108 (FIG. 1). The body 200 also has an outlet flange 210 at the outlet 206 to be coupled (e.g., via threaded fasteners) to an inlet flange 212 of the downstream pipe 112. The noise attenuator 100 includes one or more structure(s) to reduce noise of fluid flowing through the fluid passageway 202.

In the illustrated example, the noise attenuator 100 includes an example plate assembly 214 constructed in accordance with the teachings of this disclosure. The plate assembly 214 is coupled to the body 200. The example plate assembly 214 includes an example disc-shaped plate 216 and an example support frame 218. The disc-shaped plate 216 is disposed in the fluid passageway 202 and supported by the support frame 218. A diameter of the disc-shaped plate 216 is oriented perpendicular to a central axis 220 of the fluid passageway 202. The disc-shaped plate 216 has substantially the same diameter as and/or otherwise fills the portion of the fluid passageway 202 where the plate assembly 214 is disposed. The disc-shaped plate 216 affects a flow of fluid through the body 200 to reduce audible noise.

The disc-shaped plate 216 includes openings (e.g., apertures, perforations, etc.) that define flow paths through the disc-shaped plate 216 and, thus, through the fluid passageway 202. The openings are referenced in further detail in FIG. 3. Fluid is to flow from an upstream source (e.g., from the regulator outlet 108) into the inlet 204, through the disc-shaped plate 216 in the fluid passageway 202, and through the outlet 206 to the downstream pipe 112. The disc-shaped plate 216 induces a pressure drop in the flowing fluid, which slows the fluid and reduces noise caused by the flowing fluid. Therefore, in operation, the noise attenuator 100 reduces audible noise caused by high energy fluid flowing through a fluid passageway of a process control device (e.g., the fluid regulator 102 of FIG. 1) and/or the fluid passageway 202 of the noise attenuator 100 of a fluid regulator assembly (e.g., the fluid regulator assembly 104 of FIG. 1).

In the illustrated example, the disc-shaped plate 216 is supported in the fluid passageway 202 by the support frame 218. The support frame 220 has a flange 222. In some examples, the flange 222 is configured to be coupled between the outlet flange 210 and the inlet flange 212. In the illustrated example, the flange 222 is disposed in a recess 224 formed in a face 226 of the outlet flange 210. In some examples, the flange 222 is coupled to the body 200 via threaded fasteners (e.g., bolts, screws, etc.). When the inlet flange 212 of the downstream pipe 112 is coupled to the outlet flange 210 of the noise attenuator 100, the flange 222 is clamped between the outlet flange 210 and the inlet flange 212. In the illustrated example, the support frame 218 is disposed downstream of the disc-shaped plate 216 in the fluid passageway 202. The support frame 218 prevents or reduces bending in the disc-shaped plate 216 that may be caused by the pressure drop across the disc-shaped plate 216. As such, the disc-shaped plate 216 can be relatively thin, which results in less frictional losses than thicker plates.

In the illustrated example, a portion of the fluid passageway 202 is angled or tapered between the inlet 204 and the outlet 206. This diverging shape of the fluid passageway 202 enables the fluid to expand and decrease in velocity to dissipate energy of the fluid flow and/or to reduce noise. In other examples, the fluid passageway 202 may not be tapered.

In this example, the plate assembly 214 is coupled to the body 200 at or near the outlet 206. In some examples, this position of a plate or plate assembly is referred as an end plate. In other examples, the plate assembly 214 may be coupled to the body 200 such that the plate assembly 214 is disposed in another location within the fluid passageway 202 (e.g., closer to the inlet 204).

In the illustrated example, the noise attenuator 100 includes additional plates 228, 230 (sometimes referred to as internal plates) disposed in the fluid passageway 202 upstream of the plate assembly 214. The plate 228 is engaged with a ledge 231 in the fluid passageway 202. The plate 228 may be installed from the inlet 204, and the plate 230 may be installed from the outlet 206. The plates 228, 230 are coupled via a plurality of rods 232 (one of which is referenced in FIG. 2), which provide support to prevent or reduce bending of the plates 228, 230. The plates 228, 230 include openings defining flow paths through the respective plates 228, 230 to attenuate noise. The plates 228, 230 incrementally slow and reduce noise of the flow fluid. In this example, the rods 232 are not coupled to the plate assembly 214. Thus, in this example, the plate assembly 214 (e.g., the end plate) is not coupled to the plates 228, 230 (e.g., the internal plates). In other examples, the rods 232 may extend to and be coupled to the plate assembly 214. Additionally or alternatively, in some examples one or more spacers may be disposed between and in contact with the second plate 230 and the disc-shaped plate 216. In such an example, the spacer(s) would transfer loads from the plates 228, 230 to the plate assembly 214. In other examples, the noise attenuator 100 may include more or fewer internal plates. In some examples, the noise attenuator 100 may not include any internal plates, such that the disc-shaped plate 216 is the only plate implemented in the noise attenuator 100.

Figure 3:
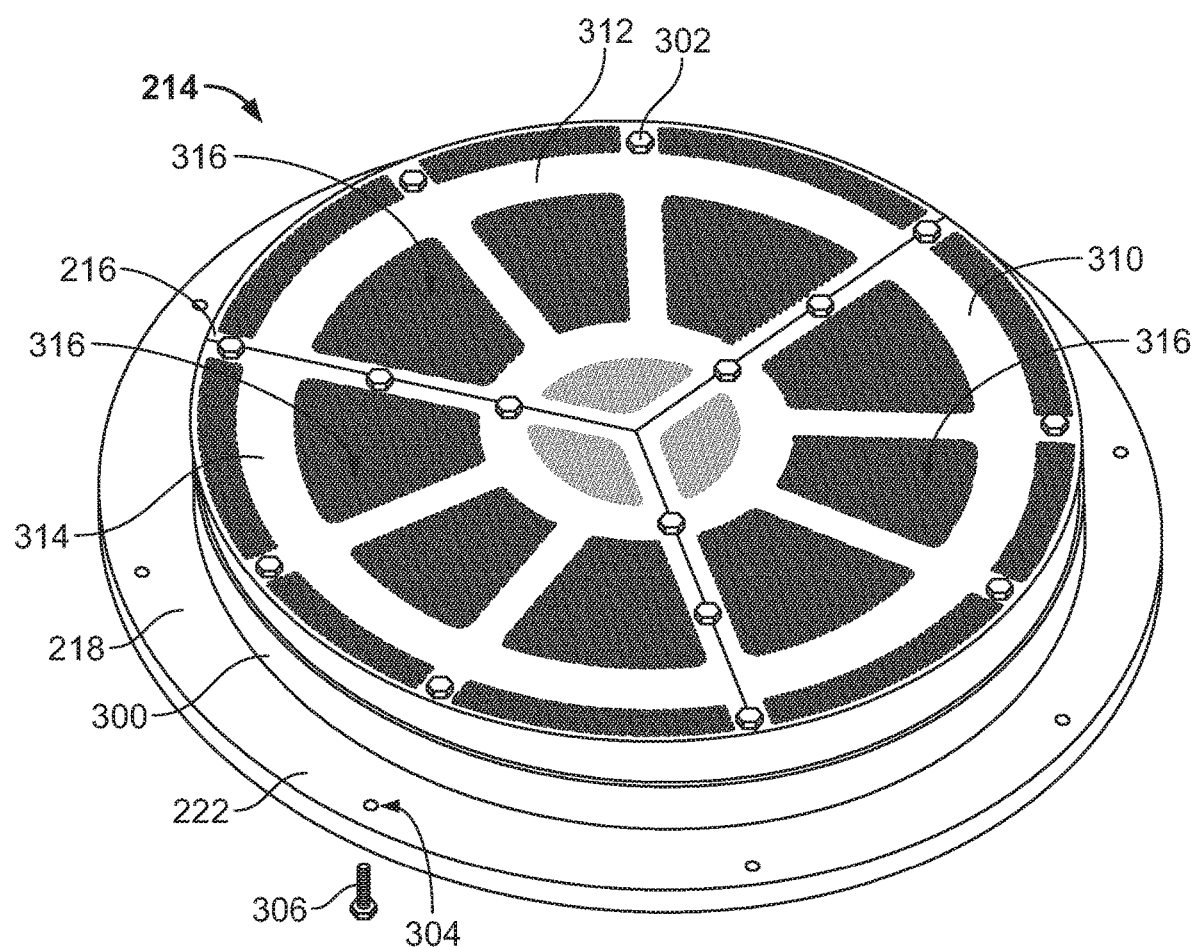
FIG. 3 is a perspective view of the example plate assembly of FIG. 2. The example plate assembly includes a support frame and a disc-shaped plate formed by a plurality of sector-shaped plates.

FIG. 3 is a perspective view of the example plate assembly 214 including the disc-shaped plate 216 and the support frame 218. In the illustrated example, the support frame 218 has a body 300, which is a ring. The disc-shaped plate 216 may be coupled to the body 300 of the support frame 218. In this example, the disc-shaped plate 216 is coupled to the body 300 of the support frame 218 via threaded fasteners 302 (e.g., bolts, screws, etc.) (one of which is referenced in FIG. 3). Any number of threaded fasteners may be used. As such, the disc-shaped plate 216 is removably coupled to the support frame 218. In other examples, the disc-shaped plate 216 may be coupled to the support frame 218 via other chemical and/or mechanical fastening techniques (e.g., press fitted joints, welded joints, adhesives, etc.).

The flange 222 extends outward from the body 300. The flange is to be coupled to the body 200 (FIG. 2) of the noise attenuator 100 (FIG. 2) to dispose the disc-shaped plate 216 in the fluid passageway 202 (FIG. 2). The flange 222 has openings 304 to receive threaded fasteners 306 (e.g., bolts, screws, etc.) (one of which is referenced in FIG. 3) for coupling the support frame 218 to the body 200.

In the illustrated example, the disc-shaped plate 216 is formed by a plurality of sector-shaped plates. In this example, the disc-shaped plate 216 is formed by three sector-shaped plates, including a first sector-shaped plate 310, a second sector-shaped plate 312, and a third sector-shaped plate 314. The sector-shaped plates 310-314 form the disc-shaped plate 216 when arranged next to each other. In this example, each of the sector-shaped plates 310-314 is a 120° sector of a circle. As such, when the sector-shaped plates 310-314 are arranged together, the sector-shaped plates 310-314 form a full 360° circle. In some examples, when the sector-shaped plates 310-314 are coupled to the support frame 218, the radial edges of the sector-shaped plates 310-314 may be in contact with each other. In other examples, the radial edges may be spaced apart from each other.

In other examples, the disc-shaped plate 216 may be formed by more or fewer sector-shaped plates. For example, the disc-shaped plate 216 may be formed by four sector-shaped plates (e.g., each being 90°), five sector-shaped plates (e.g., each being 72°), six sector-shaped plates (e.g., each being 60°, etc. In some examples, forming the disc-shaped plate 216 using a plurality of sectors enables the disc-shaped plate 216 to be printed in a 3D printer, as disclosed in further detail herein.

In this example, each of the sector-shaped plates 310-314 is the same, i.e., is the same shape and size. As such, the disc-shaped plate 216 can be easily manufactured by constructing three of the same part, as opposed to requiring differently shaped parts to be manufactured. In other examples, one or more of the sector-shaped plates may be different than the other plates. For example, two of the sector-shaped plates may be 140° sectors, and the third sector-shaped plate may be an 80° sector.

Each of the sector-shaped plates 310-314 includes a plurality of openings 316 (one of which is reference on each of the sector-shaped plates 310-314). The openings 316 form flow paths through the respective sector-shaped plates 310-314 to attenuate noise. When the plate assembly 214 is disposed in the fluid passageway 202 (FIG. 2), the fluid flows through the openings 316, which reduces or attenuates noise. The openings 316 may have a relatively small cross-sectional size or diameter (e.g., less than 0.5 mm diameter). In some examples, all of the openings 316 are the same cross-sectional size or diameter. In some examples, certain ones of the openings 316 may have different cross-sectional sizes or diameters. The support frame 218 has one or more openings behind the disc-shaped plate 216, which are shown in further detail in connection with FIG. 4. In the illustrated example, the openings 316 are grouped together into sections or groups that align with the openings in the support frame 218. In some examples, the openings 316 within each of the groups are spaced equidistant from each other.

Figure 4:
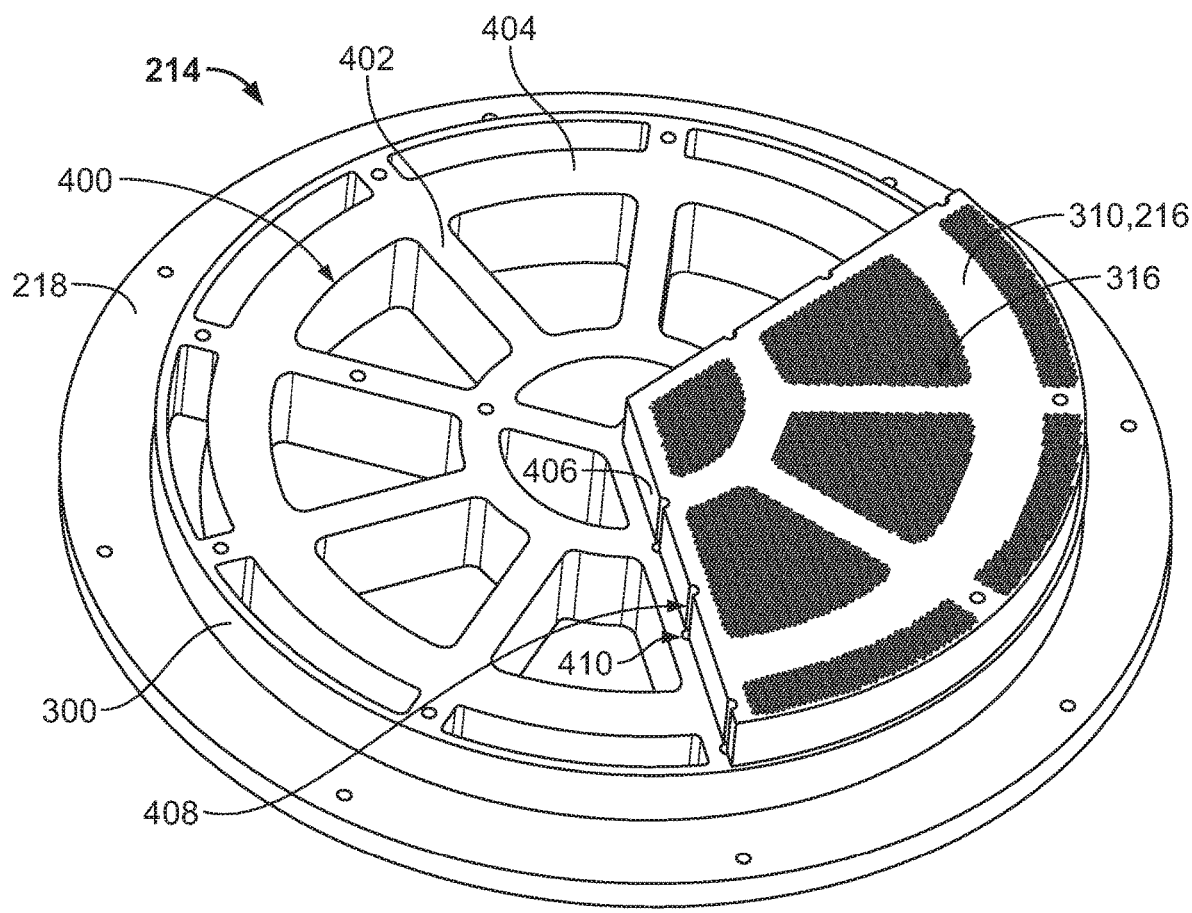
FIG. 4 is a perspective view of the example plate assembly of FIG. 3 with only one of the sector-shaped plates shown.

FIG. 4 shows the plate assembly 214 of FIG. 3 in which the second and third sector-shaped plates 312, 314 and the threaded fasteners 302, 306 have been removed. Only the first sector-shaped plate 310 is shown on the support frame 218. As shown in FIG. 4, the body 300 of the support frame 218 includes a plurality of openings 400 (one of which is referenced in FIG. 4). The openings 400 have a larger cross-sectional area than the openings 316 in the disc-shaped plate 216. The openings 400 are formed by one or more structural members extending across the body 300. For example, as shown in FIG. 4, the support frame 218 has a plurality of radially extending ribs 402 (one of which is referenced in FIG. 4) and a plurality of rings 404 (one of which is referenced in FIG. 4). The arrangement of the ribs 402 and the rings 404 defines the openings 400 through the body 300. The ribs 402 and the rings 404 provide a large area for supporting the disc-shaped plate 216 to prevent or reduce bending of the disc-shaped plate 216. In particular, the ribs 402 and the rings 404 create a larger contact area that distributes pressure-induced loads on the disc-shaped plate 216 to the support frame 218, which is a thicker, more rigid structure. The total contact area can be sized based on the flow needs and the support needs. In general, less contact area between the disc-shaped plate 216 and the support frame 218 increases the available flow area. However, more contact area between the disc-shaped plate 216 and the support frame 218 reduces the plate thickness requirements. In other examples, the support frame 218 may not include any rings. Instead, the support frame 218 may only include one or more ribs. While in this example the disc-shaped plate 216 is in contact with the support frame 218, in other examples, one or more spacers may be provided between the disc-shaped plate 216 and the support frame 218.

The support frame 218 is constructed of a rigid material. For example, the support frame 218 may be constructed of steel (e.g., carbon steel, stainless steel, etc.). In other examples, the support frame 218 may be constructed of another material, such as aluminum. In some examples, the support frame 218 is constructed via an extrusion process. In other examples, the support frame 218 may be constructed of other materials and/or other manufacturing techniques (e.g., 3D printing). In some examples, the support frame 218, including the flange 222, the body 300, the ribs 402, and the rings 404, is constructed to be a single unitary part or component. In other examples, the support frame 218 may be constructed of multiple parts that are coupled together (e.g., via fasteners, welding, etc.).

As described above, the openings 316 in the disc-shaped plate 216 may form groups that align with the openings 400 in the support frame 218. Therefore, the openings 316 are not formed throughout the entire disc-shaped plate 216. In some examples, this reduces manufacturing time and costs. For example, this may reduce the amount of time spent drilling or printing (e.g., via a 3D printer) the openings 316. In other examples, the openings 316 may be disposed in other locations. In some examples, the entire disc-shaped plate 216 is formed with openings.

In some examples, one or more of the threaded fasteners 308 (FIG. 3) may be used to couple two of the sector-shaped plates 310-314 to the support frame 218. This reduces the number of threaded fasteners used to couple the sector-shaped plates 310-314 to the support frame 218. For example, as shown in FIG. 4, the first sector-shaped plate 310 has a first radial edge 406. The first radial edge 406 has three grooves 408 (one of which is referenced in FIG. 4). Each of the grooves 408 forms half of a fastener bore. The corresponding radial edge on the third sector-shaped plate 314 (FIG. 3) has matching grooves that form the other halves of the fastener bores. When the third sector-plate 314 is disposed next to the first sector-shaped plate 310, the grooves form fastener bores. The threaded fasteners 308 (FIG. 3) extend through the fastener bores and into bores 410 (one of which is referenced in FIG. 4) formed in the support frame 218.

Figure 5:
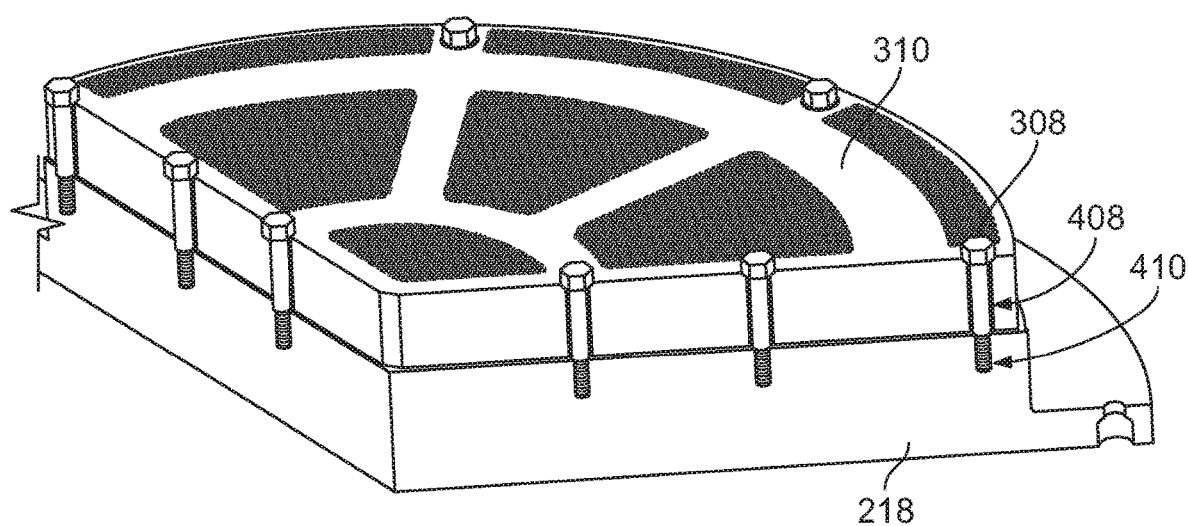
FIG. 5 is a cross-sectional view of the support frame of FIG. 3 and one of the sector-shaped plates.

FIG. 5 shows a cross-sectioned region of the support frame 218. The threaded fasteners 308 (one of which is referenced in FIG. 5) couple the first sector-shaped plate 310 to the support frame 218. The threaded fasteners 302 extend through the grooves 408 (one of which is referenced in FIG. 5) in the first sector-shaped plate 310 and into corresponding bores 410 (one of which is referenced is FIG. 5) in the support frame 218. In this example, the bores 410 in the support frame 218 are threaded, but the grooves 408 in the first sector-shaped plate 310 are not threaded. The second and third sector-shaped plate 312, 314 may be similarly structured and coupled to the support frame 218. In other examples, one or more of the grooves 408 in the first, second, and/or third sector-shaped plates 310-314 may be threaded.

As disclosed above, in some examples, the sector-shaped plates 310-314 are constructed via 3D printing. For example, the sector-shaped plates 310-314 may be constructed by a 3D printer. Therefore, each of the sector-shaped plates 310-314 is constructed via layers of fused material (e.g., metal). 3D printing is advantageous because it can be used to form plates with high density features, such as thousands of small flow paths. Further, 3D printing enables the formation of small features, such as the openings 316. As such, the openings 316 can be sized smaller than openings formed with known machining techniques.

In some examples, the disc-shaped plate 216 is formed by multiple sections because of part processing size limits of known 3D printers. In particular, the diameter of the disc-shaped plate 216 may be relatively large, such as three feet in diameter. Such a large diameter plate may be too large to construct in a typical 3D printer. Therefore, the disc-shaped plate is divided into smaller pieces, i.e., the sector-shaped plates 310-316, which are smaller and can be constructed in the 3D printer. However, if the disc-shaped plate 216 is capable of being printed in one piece in a 3D printer, then the disc-shaped plate 216 can be printed as a single unitary piece. In some examples, the disc-shaped plate 216 is printed via a 3D printer, while the other plates of the noise attenuator 100 (e.g., the plates 228, 230) are constructed via traditional machine operations. In other examples, the other plates can also be 3D printed.

FIG. 6 shows an example 3D printer 600 that may be used to print the sector-shaped plates 310-314. In some examples, the sector-shaped plates 310-314 are printed in a vertical orientation starting from a radial edge or end of the sector-shaped plates 310-314. This enables multiple sector-shaped plates to be constructed simultaneously in a single print batch. For example, as shown in FIG. 6, the sector-shaped plates 310-314 can be constructed side-by-side during the same print batch. As such, the entire disc-shaped plate 216 can be constructed via the 3D printer 600.

In this example, each of the sector-shaped plates 310-314 is the same, i.e., is the same shape and size. As such, three of the same part model may be printed via the printer 600. The sector-shaped plates 310-316 may be constructed of any material capable of being printed by a 3D printer. In some examples, the sector-shaped plates 310-316 are constructed of carbon steel, 316 stainless steel, aluminum, and/or titanium. In other examples, the sector-shaped plates 310-316 may be constructed of other materials. In some examples, additives or other components are added to make a raw material printable via 3D printing. Using 3D printing, the thickness of the sector-shaped plates 310-316 can be the same or varied depending on the desired application.

In some examples, the sector-shaped plates 310-314 are printed simultaneously in the same 3D printer during the same print batch. In other examples, the sector-shaped plates 310-314 may be formed by the same 3D printer during separate print batches. In still other examples, the sector-shaped plates 310-314 may be formed by different printers at the same time or different times.

In some examples, the disc-shaped plate 216 is constructed via 3D printing, while the support frame 218 is constructed via traditional machining techniques (e.g., extruding, drilling, laser cutting, water jet cutting, etc.). In other examples, the support frame 218 may also be constructed via 3D printing. For example, the support frame 218 may be constructed in the 3D printer 600.

Because 3D printing involves building layer upon layer of material, 3D printing has limitations with respect to overhung surfaces. Most 3D printers have a critical angle, such as 45°. Any surface that is to be angled beyond that critical printing angle may require temporary supports. Otherwise, the material may yield or fall apart while printing.

For example, because the sector-shaped plates 310-314 are printed vertically, the openings 316 may not be formed as circular. FIG. 7A shows an enlarged view of one of the openings 316 formed in the first sector-shaped plate 310. As shown, the opening 316 is tear-dropped shape. The upper part of the opening 316 is printed at the maximum allowable angle, which may be 45°, for example. This results in a tear-dropped shaped opening. The other openings 316 may be similarly shaped. This tear-dropped shaped opening does not adversely affect the flow of fluid through the openings 316.

In other examples, the openings 316 may be shaped differently. For example, if the disc-shaped plate 216 is printed in a horizontal orientation, the openings may be formed as circular or round, as shown in FIG. 7B. In still other examples, the openings 316 may have a different shape (e.g., hexagonal, polygonal). The flow paths created by the openings 316 may be axially straight, overlapped, rotated, or twisted. In some examples, all of the openings 316 are identical. In other examples, the openings 316 may have different diameters and/or different shapes. The distances between adjacent openings 316 can be the same or can be varied within the disc-shaped plate 216 or within the same noise attenuator.

In other examples, the disc-shaped plate 216, formed as a single piece or by a plurality sector-shaped plates, may be constructed by traditional (subtractive) manufacturing operations. For example, the disc-shaped plate 216 and/or the sector-shaped plates 310-314 may be perforated sheet metal, a machined plate, stacked sheet metal, etc. Therefore, the disc-shaped plate 216 may be constructed from a single piece of perforated sheet metal, stacked perforated sheet metal (e.g., coupled via threaded fasteners), sections of perforated sheet metal, 3D printed units (e.g., constructed of metal or plastic), 3D printed whole or sectional units, and/or single or sectional machined parts (single or sectional). In some examples, the disc-shaped plate 216 and the support frame 218 are constructed of a single unitary part or component. For example, the entire plate assembly 214 may be printed as a single part. While in the illustrated examples above only one disc-shaped plate is coupled to the support frame 218, in other examples, multiple disc-shaped plates may be stacked and coupled to the support frame 218. The disc-shaped plates may be coupled via threaded fasteners. In some examples, such as where high back-pressure is experienced, a second support frame may be disposed upstream of the disc-shaped plate 216. Therefore the disc-shaped plate 216 may be clamped between two support frames.

Figure 8:
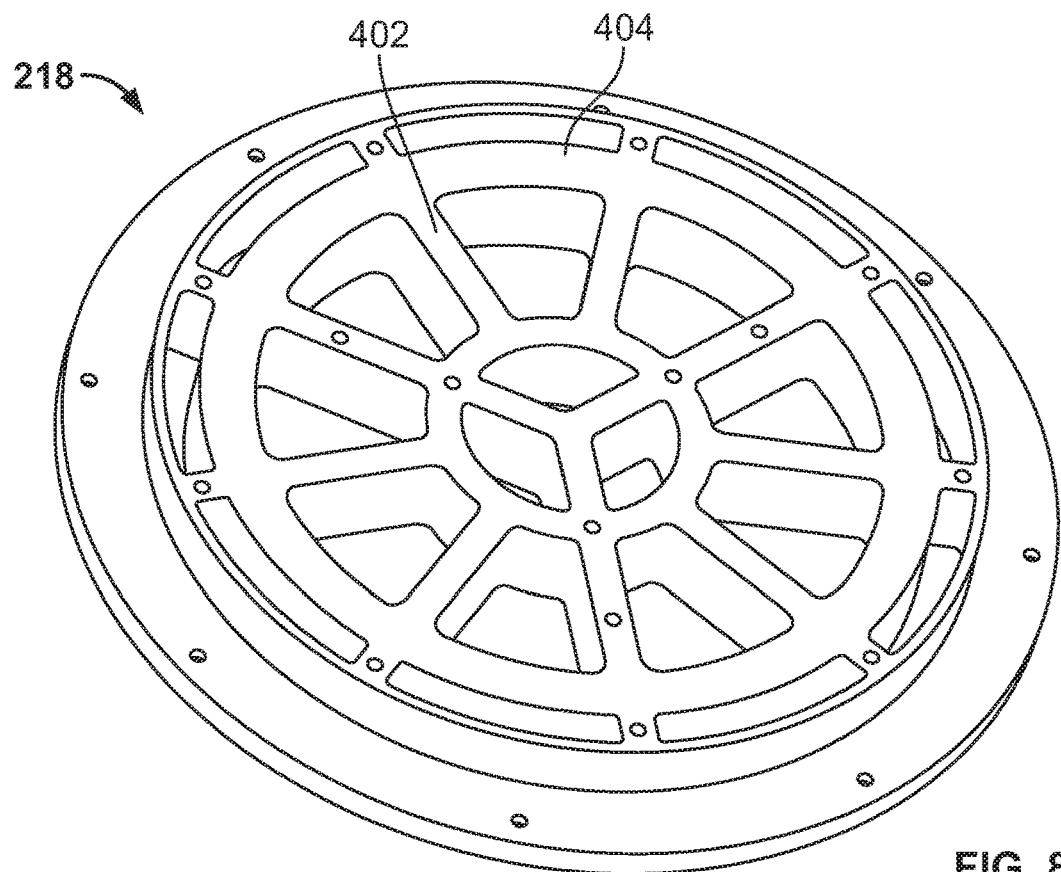
FIG. 8 is a perspective view of the example support frame of the example plate assembly of FIG. 3.

FIG. 8 is a perspective view of the example support frame 218. As disclosed above, the support frame 218 may be constructed of a single unitary part or component, or the support frame 218 may be constructed of multiple parts that are coupled together. As disclosed above, the support frame 218 has an arrangement of structural members (e.g., the ribs 402 and the rings 404) to support the disc-shaped plate 216 (FIGS. 3 and 4) in the fluid passageway 202 (FIG. 2) while also allowing fluid flow through the support frame 218. The support frame 218 may have other arrangements or layouts of the structural members.

Figure 9:
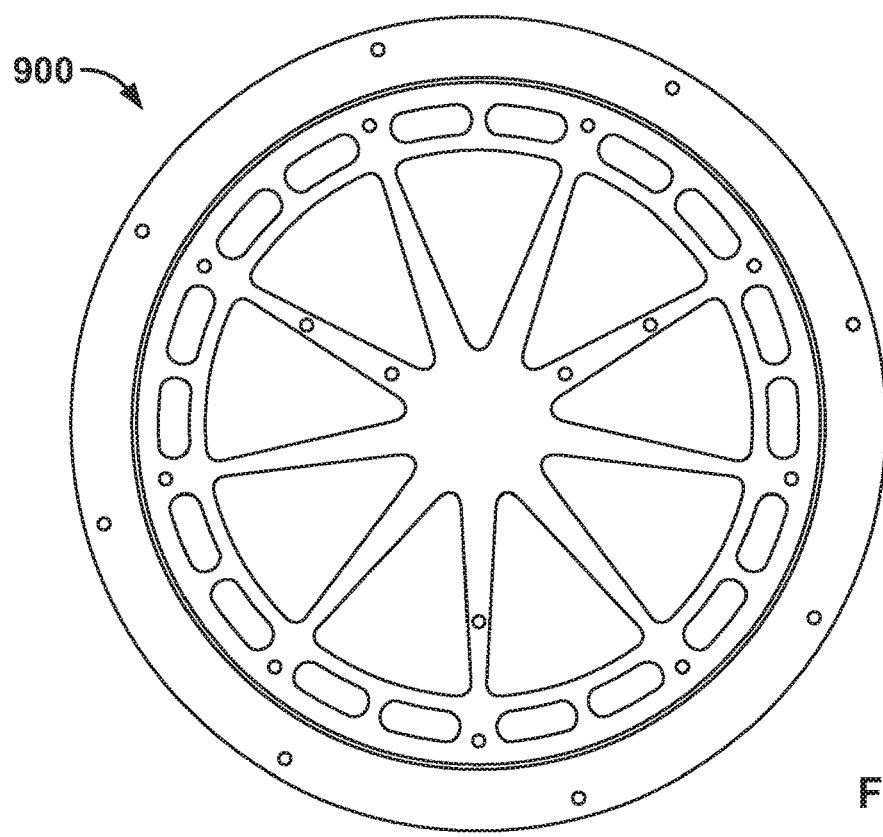
FIG. 9 is an end view of another example support frame that may be used with the example disc-shaped plate of FIG. 3.
Figure 10:
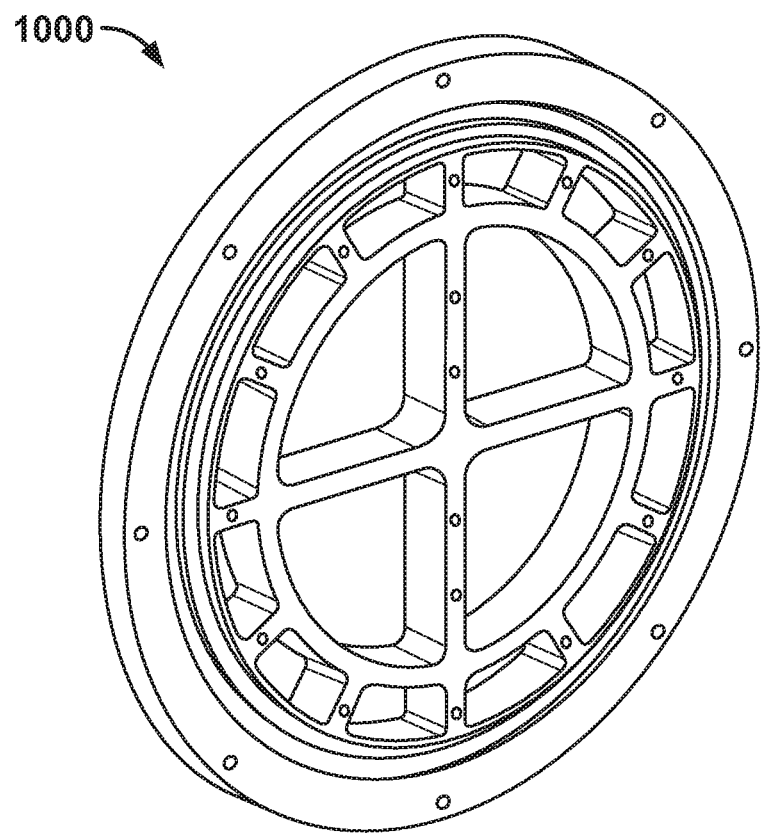
FIG. 10 is a perspective view of another example support frame that may be used with the example disc-shaped plate of FIG. 3.
Figure 11:
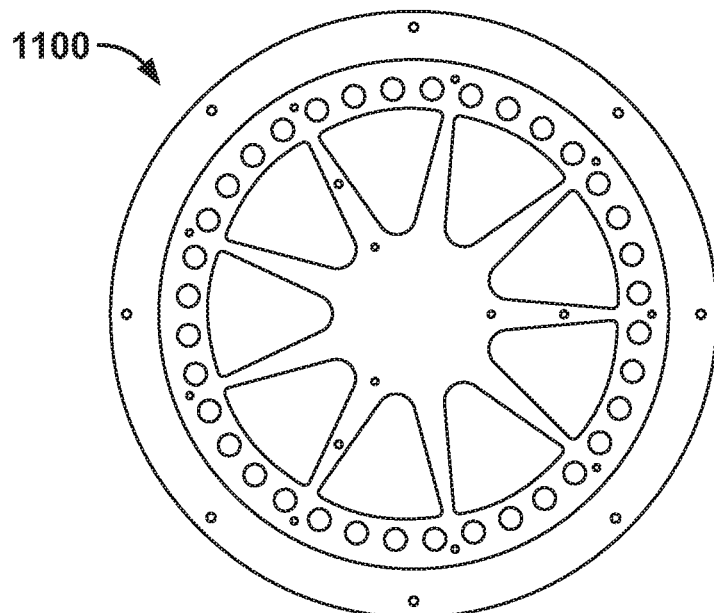
FIG. 11 is an end view of another example support frame that may be used with the example disc-shaped plate of FIG. 3.

For example, FIG. 9 is an end view of another example support frame 900 that may be used in place of the support frame 218. The support frame 900 has an arrangement of structural members to support the disc-shaped plate 216. FIG. 10 is a perspective view of another example support frame 1000 that may be used in place of the support frame 218. The support frame 1000 has an arrangement of structural members to support the disc-shaped plate 216. FIG. 11 is an end view of another example support frame 1100 that may be used in place of the support frame 218. The support frame 1100 has an arrangement of structural members to support the disc-shaped plate 216. The size, thickness, and arrangement of the structural members may have an effect on strength and flow efficiency of a support frame. For example, the support frame 900 may have better flow than the support frame 1100 because the support frame 900 has less structure in the center. However, the support frame 1100 may be stronger than the support frame 900 because of the increased structure in the center and, thus, can be sized thinner than the support frame 900. As another example, the support frame 1000 may have better flow than the support frame 218, but the support frame 1000 may be weaker than the support frame 218 because the support frame 1000 does not have the center ring as in the support frame 218.

Figure 12:
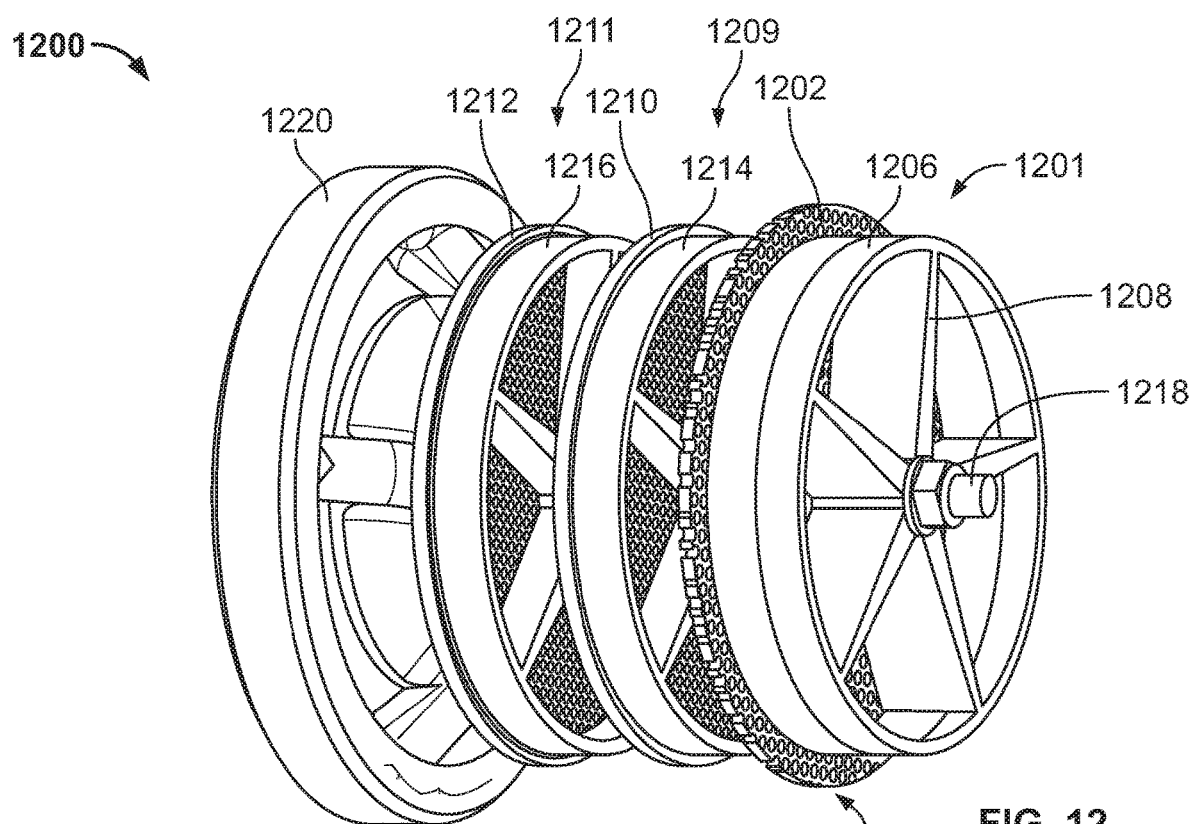
FIG. 12 is a perspective view of an example cartridge having multiple example plate assemblies that may be implemented in a noise attenuator.
Figure 13:
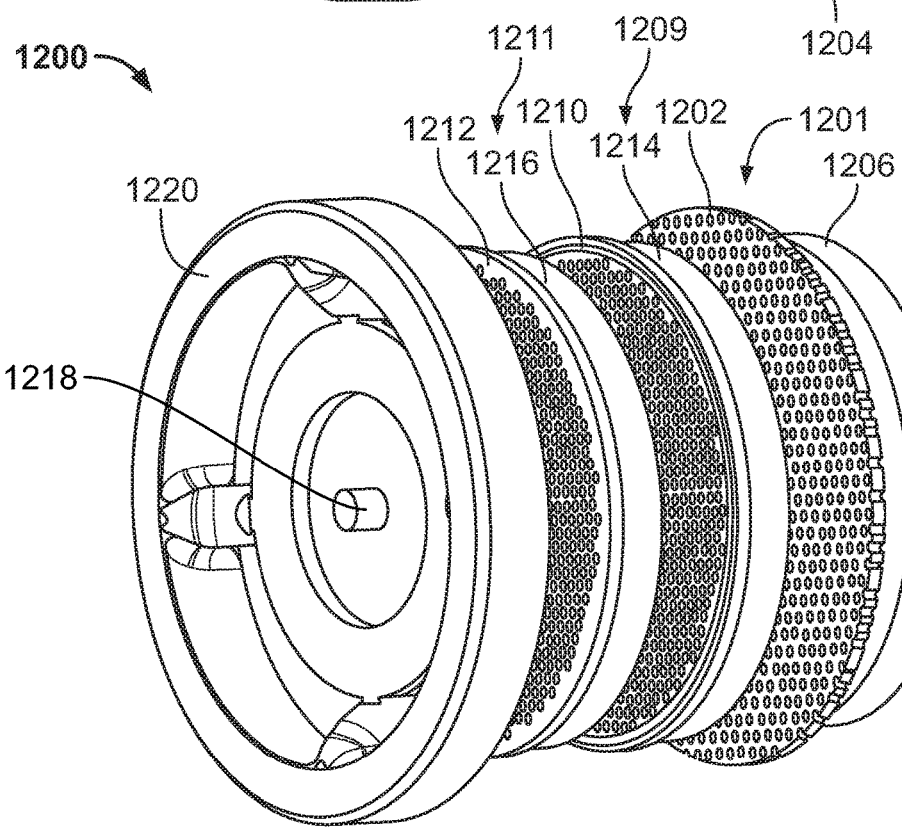
FIG. 13 is another perspective view of the example cartridge of FIG. 12.

FIGS. 12 and 13 are perspective views of an example cartridge 1200 (which may also be referred to as a silencer assembly) that may be used to attenuate noise of fluid flow in a fluid body. For example, the cartridge 1200 may be installed in the fluid passageway 202 (FIG. 2) of the noise attenuator 100 (FIG. 1) in addition to or as an alternative to the other plates. The example cartridge 1200 includes multiple plate assemblies forming multiple noise attenuation stages.

In the illustrated example, the cartridge 1200 includes a first plate assembly 1201 including a first disc-shaped plate 1202 for attenuating noise. The first disc-shaped plate 1202 has a plurality of openings 1204 (one of which is referenced in FIG. 12) forming flow paths through the first disc-shaped plate 1202. The first disc-shaped plate 1202 is coupled to and/or otherwise supported by a first support frame 1206, which operates similar to the support frame 218 disclosed above. When the cartridge 1200 is disposed in a fluid body, the first support frame 1206 is disposed downstream of the first disc-shaped plate 1202. The first support frame 1206 has a plurality of radially extending ribs 1208. Any number of ribs may be employed. The first support frame 1206 prevents or reduces bending of the first disc-shaped plate 1202 caused by pressure differential across the first disc-shaped plate 1202. As such, the first disc-shaped plate 1202 can be sized relatively thin compared known noise attenuator plates, because the first disc-shaped plate 1202 does not require the structural rigidity to withstand the pressure differential. Such a thin plate is easier and less expensive to manufacture.

In some examples, the cartridge 1200 includes one or more additional plate assemblies for attenuating noise. For example, as shown in FIGS. 12 and 13, the cartridge 1200 includes a second plate assembly 1209 including a second disc-shaped plate 1210 and a third plate assembly 1211 including a third disc-shaped plate 1212. Each of the second and third disc-shaped plates 1210, 1212 has a plurality of openings forming flow paths. The second disc-shaped plate 1210 is coupled to and/or otherwise supported by a second support frame 1214. The third disc-shaped plate 1212 is coupled to and/or otherwise supported by a second support frame 1216. In other examples, the cartridge 1200 may include more than three plate assemblies.

In some examples, the first, second, and third disc-shaped plates 1202, 1210, 1212 are coupled to the respective first, second, and third support frames 1206, 1214, 1216 frames via threaded fasteners. In other examples, the first, second, and third disc-shaped plates 1202, 1210, 1212 may be coupled to the respective first, second, and third support frames 1206, 1214, 1216 using other chemical and/or mechanical fastening techniques.

In the illustrated example, the first, second, and third plate assemblies 1201, 1209, 1211 are coupled to and spaced apart along a central rod 1218. The central rod 1218 is coupled to and extends from a base 1220. To install the cartridge 1200 in a fluid body, the base 1220 may be coupled to the fluid body so that the first, second, and third plate assemblies 1201, 1209, 1211 are disposed downstream of the base 1220. For example, the base 1220 may be coupled to the body 200 of the noise attenuator 100 near the inlet 204, such that the first, second, and third plate assemblies 1201, 1209, 1211 are disposed in the fluid passageway 202.

In this example, the first, second, and third disc-shaped plates 1202, 1210, 1212 are perforated plates. The first, second, and third disc-shaped plates 1202, 1210, 1212 may be constructed via a machining process. In other examples, the first, second, and/or third disc-shaped plates 1202, 1210, 1212 may be constructed via other manufacturing processes. In some examples, the first, second, and/or third disc-shaped plates 1202, 1210, 1212 are constructed via 3D printing (e.g., by the 3D printer 600 of FIG. 6). In this example, each of the first, second, and third disc-shaped plates 1202, 1210, 1212 is a single unitary part or component. In other examples, any of the first, second, and/or third disc-shaped plates 1202, 1210, 1212 may be constructed of two or more sector-shaped plates as disclosed in other examples herein.

In some examples, the support frames 1206, 1214, 1216 are constructed via an extrusion process. For example, a cylinder of material may be extruded into the shape of the support frames 1206, 1214, 1216. Then, the cylinder may be cut into sections to form the individual support frames 1206, 1214, 1216. The support frames 1206, 1214, 1216 can be cut to the size (length) according to specific application loading requirements. As shown in FIGS. 12 and 13, the first support frame 1206 is a double frame compared to the second and third support frames 1214, 1216. Any number of support frames may be used in each of the plate assemblies 1201, 1209, 1211. In other examples, the support frames 1206, 1214, 1216 can be constructed using other manufacturing processes, such as 3D printing.

In some examples, the disc-shaped plates 1202, 1210, 1212 are the same diameter as their associated support frames 1206, 1214, 1216. In other examples, any of the disc-shaped plates 1202, 1210, 1212 may be larger than their associated support frames 1206, 1214, 1216. For example, as shown in FIGS. 12 and 13, the first disc-shaped plate 1202 has a larger diameter than the first support frame 1206. The disc-shaped plates 1202, 1210, 1212 are sized to substantially fill the fluid passageway in which the respective disc-shaped plates 1202, 1210, 1212 are to be disposed.

Figure 14:
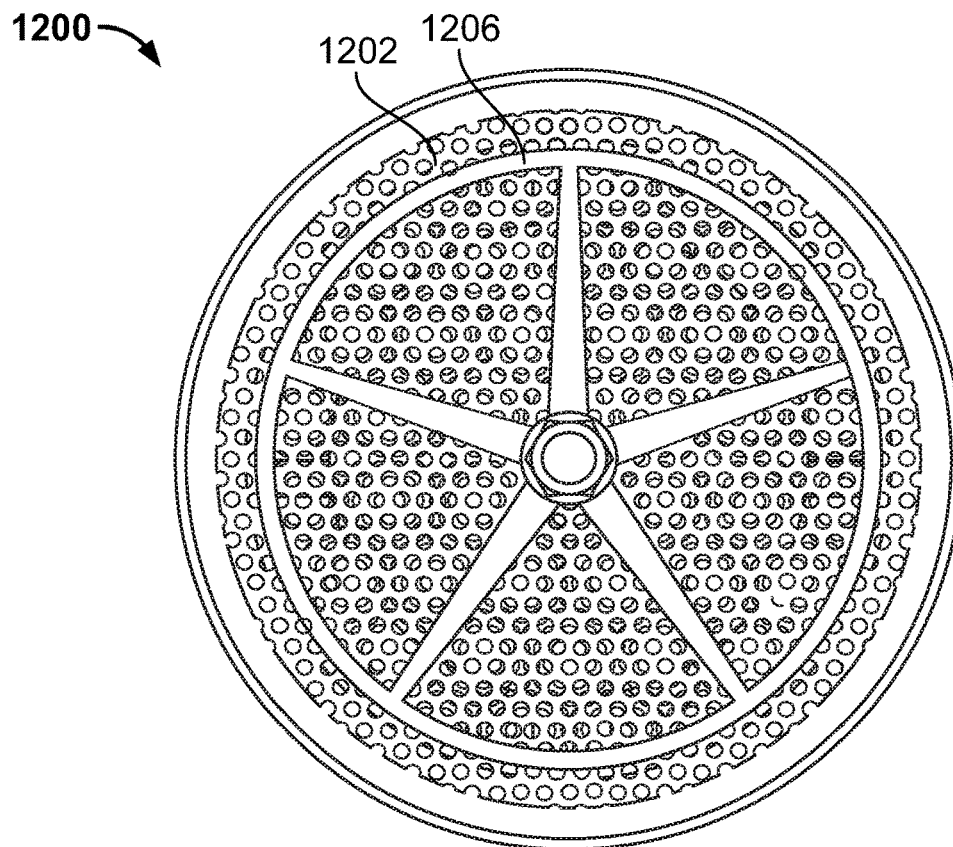
FIG. 14 is an end view of the example cartridge of FIG. 12.
Figure 15:
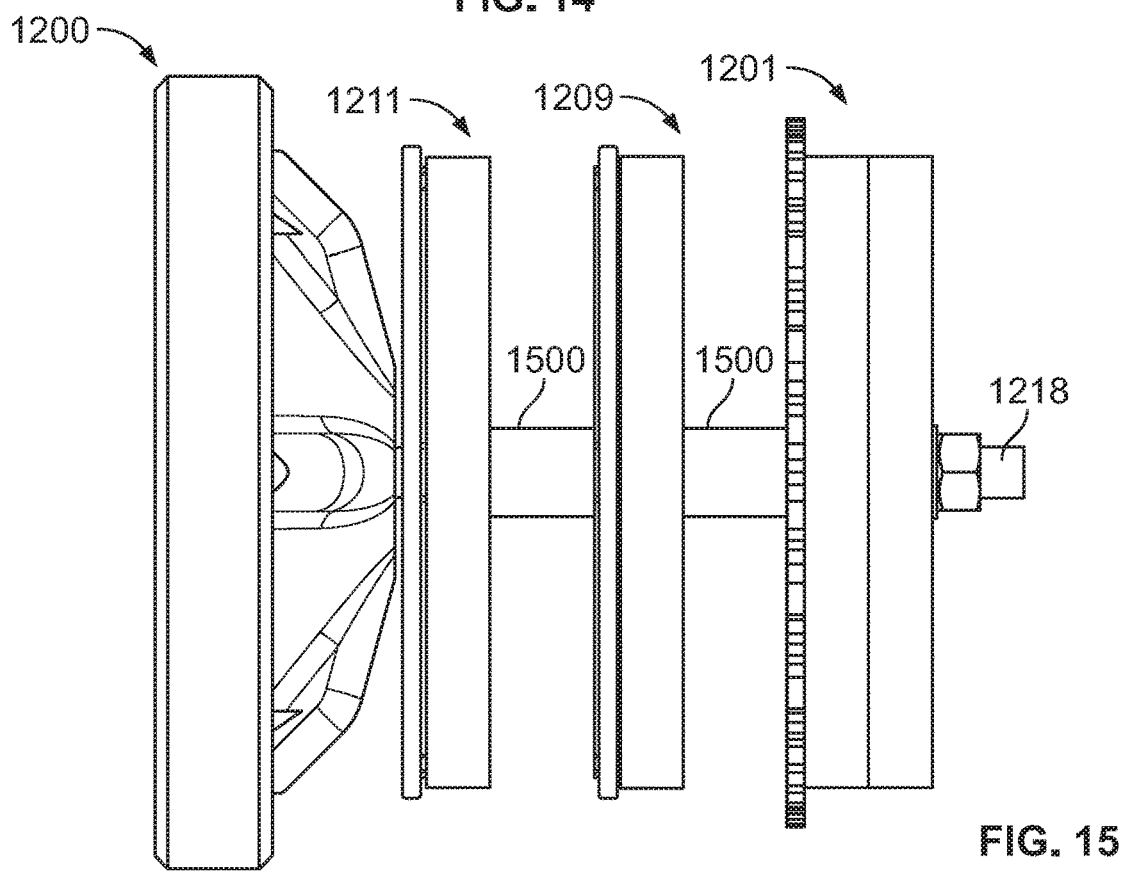
FIG. 15 is a side view of the example cartridge of FIG. 12.

FIG. 14 is an end view of the cartridge 1200 showing the first disc-shaped plate 1202 and the first support frame 1206. FIG. 15 is a side view the cartridge 1200. As shown in FIG. 15, the plate assemblies 1201, 1209, 1211 are coupled to the central rod 1218. In some examples, more than one rod may be used to connect the plate assemblies 1201, 1209, 1211. In the illustrated example, the plate assemblies 1201, 1209, 1211 are spaced apart from each other by spacers 1500. The plate assemblies 1201, 1209, 1211 may be spaced apart any desired distance. In some examples, the spacers 1500 are constructed via an extrusion process. In other examples, the plate assemblies 1201, 1209, 1211 may not be spaced apart. Instead, the plate assemblies 1201, 1209, 1211 may be stacked or disposed adjacent (e.g., in contact) with each other.

The width of the structural members (e.g., the ribs 1208) and the axial length of the support frames 1206, 1214, 1216 may be changed depending on the desired application. For example, a user that desires increased flow may use a support frame with thinner ribs but a lager axial length. In another example, a user that desires significant noise reeducation may use a noise attenuator with multiple stages, where each stage supports a small pressure drop, as compared to a noise attenuator with fewer stages.

FIG. 16 is a flowchart representative of an example method 1600 of manufacturing a disc-shaped plate and installing the disc-shaped plate in a fluid body of a noise attenuator. The example method 1600 may be used to manufacture and install any of the example disc-shaped plates disclosed herein having multiple plate sections or sectors.

At block 1602, the example method 1600 includes printing, via a 3D printer, a plurality of sector-shaped plates. For example, as shown in FIG. 6, the first, second, and third sector-shaped plates 310-314 are printed via the 3D printer 600. The sector-shaped plates 310-314 include the openings 316 that form flow paths. Each of the sector-shaped plates 310-314 may be the same size (e.g., each being 120° sector) or different sizes. In some examples, each of the sector-shaped plates 310-314 is printed in a vertical orientation. This enables multiple sector-shaped plates to be printed side-by-side in the same print batch. Therefore, the sector-shaped plates 310-314 may be printed simultaneously as part of the same print batch. In some examples, one or more post-machining operations (e.g., drilling, cutting, sanding, etc.) may be performed to smooth the surfaces of the sector-shaped plates 310-314.

At block 1604, the example method 1600 includes coupling the plurality of sector-shaped plates to a support frame. For example, as shown in FIG. 3, the sector-shaped plates 310-314 are coupled to the support frame 218. In some examples, the sector-shaped plates 310-314 are coupled to the support frame 218 via the threaded fasteners 302. In some examples, one or more of the threaded fasteners 308 couple two of the sector-shaped plates 310-314 to the support frame 218.

At block 1606, the example method 1606 includes coupling the support frame to a fluid body such that a disc-shaped plate formed by the plurality of sector-shaped plates is disposed in a fluid passageway of the fluid body. For example, as shown in FIG. 2, the support frame 218 is coupled to the body 200 of the noise attenuator 100 such that the disc-shaped plate 216 is disposed in the fluid passageway 202. The support frame 218 may be coupled to the body 200 via the threaded fasteners 306. In other examples, if the disc-shaped plate 216 is small enough to be printed as one piece in a 3D printer, the entire disc-shaped plate 216 may be printed as a single plate, which may then be coupled to the support frame 218 and disposed in the fluid passageway 202.

If a plate is not constructed of multiple plate sectors or sections, the plate may be manufactured as a single-piece plate via 3D printing or by other traditional manufacturing process (e.g., laser cutting, water jet cutting, drilling, etc.) and similarly coupled to a support frame. For example, the disc-shaped plates 1202, 1210, 1212 in FIG. 12 are single-piece plates. The disc-shaped plates 1202, 1210, 1212 may be machined plates. The disc-shaped plates 1202, 1210, 1212 are coupled to the respective support frames 1206, 1214, 1216, which are then coupled (as a cartridge) to and/or otherwise disposed in a fluid passageway of a fluid body.

Figure 17:
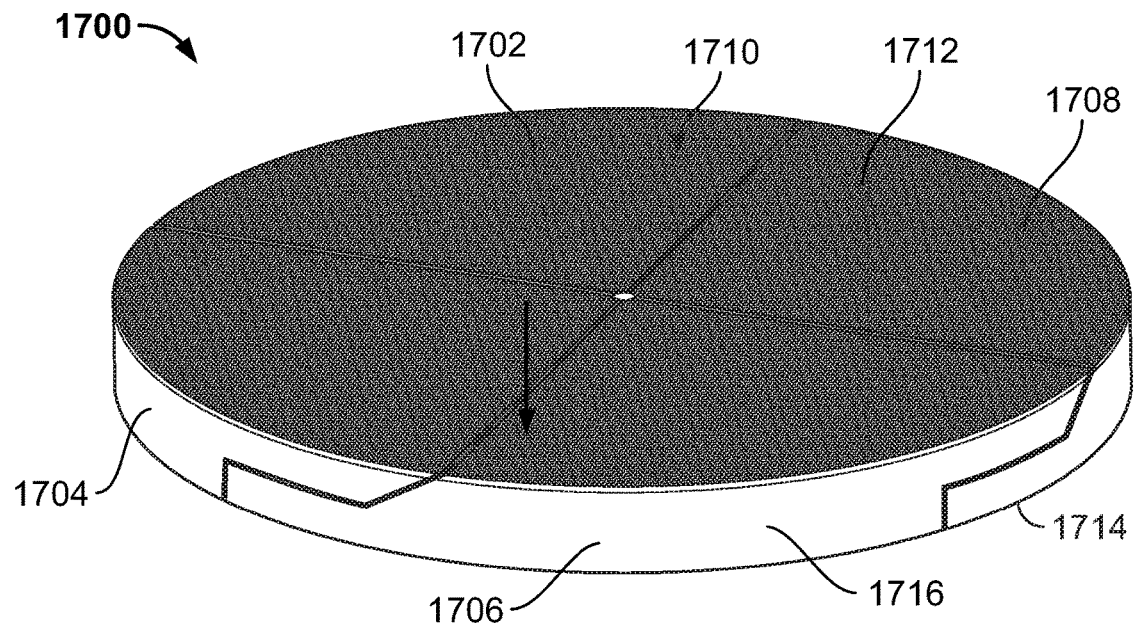
FIG. 17 is a perspective view of an example disc-shaped plate formed by a plurality of example sector-shaped plates that may be implemented in a noise attenuator.

In some of the examples disclosed above, the disc-shaped plate is supported by a support frame. Also disclosed herein are examples in which a support frame is not used. FIG. 17 is a perspective view of an example disc-shaped plate 1700 constructed in accordance with the teachings of this disclose. The example disc-shaped plate 1700 may be used in a noise attenuator to reduce noise of the flowing fluid. The example disc-shaped plate 1700 is designed such that neither a support structure nor fasteners are utilized.

In the illustrated example, the disc-shaped plate 1700 is formed or defined by a plurality of sector-shaped plates. In particular, in this example, the disc-shaped plate 1700 includes a first sector-shaped plate 1702, a second sector-shaped plate 1704, a third sector-shaped plate 1706, and a fourth sector-shaped plate 1708. The sector-shaped plates 1702-1708, when arranged together, form the disc-shaped plate 1700. In this example, each of the sector-shaped plates 1702-1708, when arranged together, forms a 90° sector of a circle. In other examples, the disc-shaped plate 1700 may be formed by more or fewer sector-shaped plates. For example, the disc-shaped plate 1700 may be formed by five sector-shaped plates (e.g., each forming 72° of a circle), six sector-shaped plates (e.g., each forming 60° of a circle), etc. In this example, each of the sector-shaped plates 1702-1708 is the same, i.e., forms 90° of the disc-shaped plate 1700. In other examples, one or more of the sector-shaped plates 1702-1708 may be sized differently. For example, three of the sector-shaped plates may each form 100° of the disc-shaped plate 1700, while the fourth sector-shaped plate may form 60° of the disc-shaped plate 1700.

Each of the sector-shaped plates 1702-1708 has a plurality of openings 1710 (one of which is referenced in connection with the first sector-shaped plate 1702 in FIG. 17) extending through the respective sector-shaped plates 1702-1708. The openings 1710 form flow paths through the respective sector-shaped plates 1702-1708 to attenuate noise. The disc-shaped plate 1700 has a first side 1712, a second side 1714 opposite the first side 1712, and an outer peripheral edge 1716. When the disc-shaped plate 1700 is installed in a fluid body, one of the sides 1712, 1714 faces upstream and one of the sides 1712, 1714 faces downstream.

In some examples, the sector-shaped plates 1702-1708 are constructed via a 3D printing process. For example, the sector-shaped plates 1702-1708 may be printed by the printer 600 of FIG. 6. Therefore, each of the sector-shaped plates 1702-1708 is constructed via layers of fused material (e.g., metal). In some examples, the diameter of the disc-shaped plate 1700 may be larger than the printing capacity of a 3D printer. Therefore, printing the individual sector-shaped plates 1702-1708 enables the disc-shaped plate 1700 to be constructed via 3D printing. As disclosed above, 3D printing enables the formation of extremely small openings. Further, as compared to machining processes, 3D printing wastes minimal material. In this example, each of the sector-shaped plates 1702-1708 is the same, i.e., is the same shape and size. As such, four of the same sector-shaped plate can be manufactured using the same print model, which makes manufacturing and assembly easier.

Figure 18:
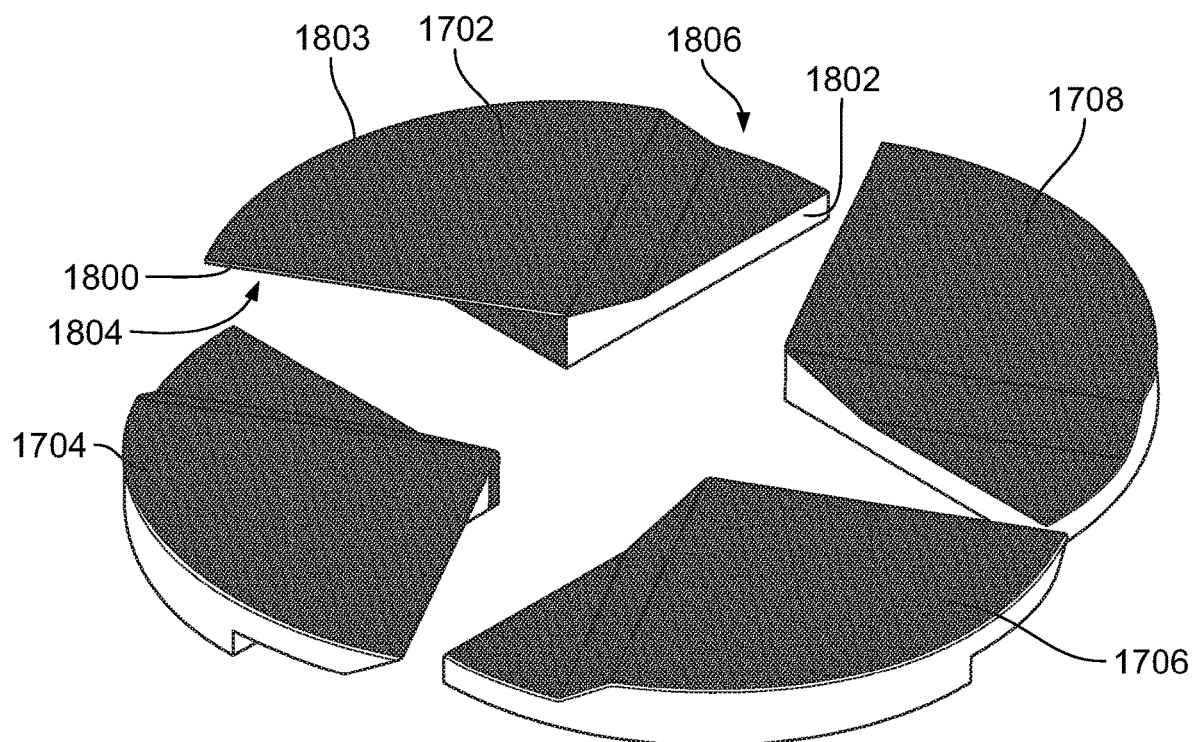
FIG. 18 is an exploded view of the example disc-shaped plate of FIG. 17.

FIG. 18 shows the sector-shaped plates 1702-1708 as separated. The sector-shaped plates 1702-1708 may be pushed together to form the disc-shaped plate 1700. For example, the sector-shaped plates 1702-1708 may be laid on a flat surface and pushed radially inward toward each other.

Each of the sector-shaped plates 1702-1708 mates or interlocks with the two adjacent sector-shaped plates 1702-1708. For example, the first sector-shaped plate 1702 has a first radial edge 1800, a second radial edge 1802, and a peripheral edge 1803. The first radial edge 1800 forms or includes a first mating feature 1804 and the second radial edge 1802 forms or includes a second mating feature 1806 that is complementary to the first mating feature 1804. The mating features 1804, 1806 may also be referred to as locking features. The mating features 1804, 1806 may be male and female shaped features. In this example, the first mating feature 1804 is an angled underhang, and the second mating feature 1806 is an angled overhang that is complementary to or opposite of the first mating feature 1804. The second, third, and fourth sector-shaped plates 1704-1708 are the same as the first sector-shaped plate 1702. When the sector-shaped plates 1702-1708 are assembled into the disc-shaped plate 1700, the first mating feature 1804 of each of the sector-shaped plates 1702-1708 engages or mates with the second mating feature 1806 of an adjacent one of the sector-shaped plates 1702-1708. Therefore, the first mating feature 1804 of the first sector-shaped plate 1702 mates with the second mating feature 1806 of the second sector-shaped plate 1704, the first mating feature 1804 of the second sector-shaped plate 1704 mates with the second mating feature 1806 of the third sector-shaped plate 1706, and so forth. As such, each of the sector-shaped plates 1702-1708 overlaps in an axial direction with two adjacent ones of the sector-shaped plates 1702-1708. For example, the first sector-shaped plate 1702 overlaps in an axial direction with the second sector-shaped plate 1704 and the fourth sector-shaped plate 1708. As used herein, an axial direction refers to a direction that is perpendicular to a diameter or radius of a disc-shaped plate.

This mating design prevents the sector-shaped plates 1702-1708 from being axially displaced or moved under high pressure of the fluid flow. For example, if a uniform force is applied across the first side 1712 (e.g., an upstream facing side) or the second side 1714 (e.g., a downstream facing side) of the disc-shaped plate 1700, the first and second mating features 1804, 1806 of each of the sector-shaped plates 1702-1708 prevent the sector-shaped plates 1702-1708 from collapsing or being axially displaced. One force component is transmitted at contact surfaces of the first and second mating features 1804, 1806 that are parallel to the first and second sides 1712, 1714 of the disc-shaped plate 1700. This force is contained by a step or other parallel-surface feature where the disc-shaped plate 1700 is mounted (e.g., by the shoulder 1920 of the recess 1918 shown in FIG. 19). Another force component may be transmitted at oblique surfaces (e.g., the angled surfaces of the first and second mating features 1804, 1806) that converts into a radial separation force. This force component is contained by an inside diameter of a cavity where the disc-shaped plate 1700 is mounted (e.g., by the inner dimeter surface 1921 of the recess 1918 shown in FIG. 19). Thus, the example mating design can reduce or prevent bending without the need for support structures or fasteners. Therefore, in this example, the plurality of sector-shaped plates 1702-1708 are not coupled by fasteners or a support structure. In other examples, the first and second mating features 1804, 1806 may be shaped differently. Various examples of other shaped mating features are disclosed herein. The amount of axial overlap can be sized according to pressure loading requirements.

In some examples, the mating design is resistant to movement if a uniform load is applied across the disc-shaped plate 1700, but the disc-shaped plate 1700 may be weak and potentially collapse if a non-uniform force (e.g., a point force) is applied to a specific location on one of the sector-shaped plates 1702-1708. For example, referring to FIG. 17, if a point force is applied in the direction of the arrow near an edge of the third sector-shaped plate 1706, the point force may cause a torque on the third sector-shaped plate 1706 that causes the third sector-shaped plate 1706 to twist because there are no overlapping mating feature behind the third sector-shaped plate 1706 near that edge. Other example mating feature designs are disclosed herein that have dual overlapping designs, such that a point force would not cause twisting or collapsing of the sector-shaped plates 1702-1708.

In this example, the sector-shaped plates 1702-1708 include the openings 1710 (flow paths) along the portions of the sector-shaped plates 1702-1708 forming the first and second mating features 1804, 1806. When the sector-shaped plates 1702-1708 are assembled in the disc-shaped plate 1700, the openings 1710 in the portions of the sector-shaped plates 1702-1708 forming the first and second mating features 1804, 1806 align with corresponding openings 1710 in the first and second mating features 1804, 1806 of the adjacent sector-shaped plates 1702-1708. In some examples, this maximizes the number of flow paths through the disc-shaped plate 1700. In other examples, the sector-shaped plates 1702-1708 may not include openings along the portions of the sector-shaped plates 1702-1708 forming the first and/or second mating features 1804, 1806.

Figure 19:
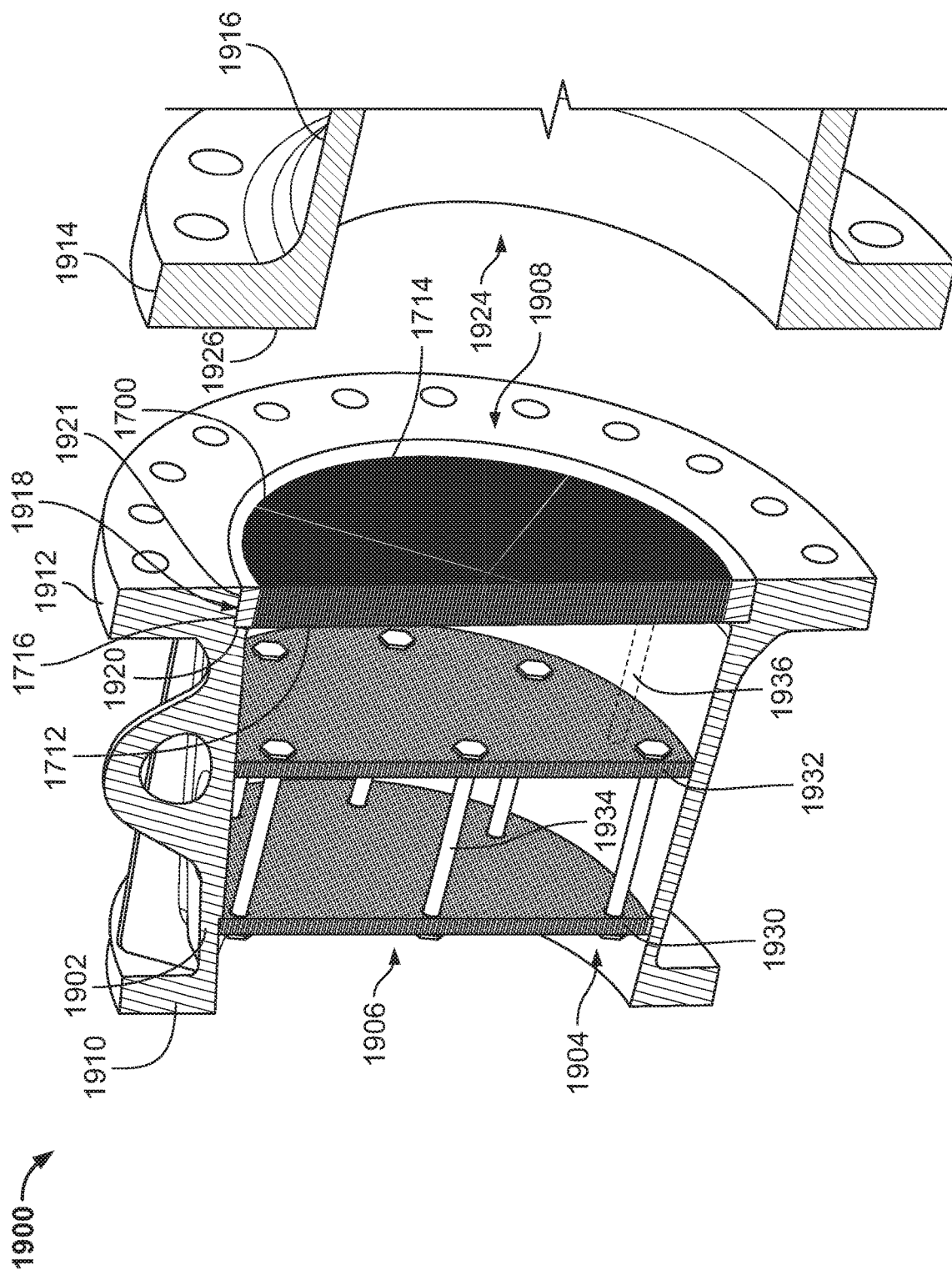
FIG. 19 is a perspective cross-sectional view of an example noise attenuator in which the example disc-shaped plate of FIG. 17 is implemented.

FIG. 19 is a perspective cross-sectional view of an example noise attenuator 1900 in which the example disc-shaped plate 1700 may be implemented. The noise attenuator 1900 includes a body 1902 defining a fluid passageway 1904 between an inlet 1906 and an outlet 1908. The body 1902 has an inlet flange 1910 at the inlet 1906 to be coupled (e.g., via threaded fasteners) to an upstream device or pipe. For example, the inlet flange 1910 may be coupled to the regulator outlet 108 of FIGS. 1 and 2. In other examples, the noise attenuator 1900 may be coupled to and/or otherwise integrated with any other type of process control device (e.g., a valve) and/or any other device that changes a characteristic of a fluid and creates noise. The body 1902 also has an outlet flange 1912 at the outlet 1908 to be coupled (e.g., via threaded fasteners) to an inlet flange 1914 of a downstream pipe 1916 shown in FIG. 19.

In this example, the disc-shaped plate 1700 is disposed in the fluid passageway 1904 at or near the outlet 1908. As such, the example disc-shaped plate 1700 may be referred to as an end plate. In the illustrated example, the body 1902 includes a recess 1918 formed in the outlet flange 1912 around the outlet 1908. The recess 1918 forms a shoulder 1920 and an inner diameter surface 1921. The disc-shaped plate 1700 is disposed in the recess 1918 such that an outer peripheral region of the first side 1712 of the disc-shaped plate is engaged with the shoulder 1920, and the outer peripheral edge 1716 is engaged with or near the inner diameter surface 1921. An inlet 1924 of the downstream pipe 1916 has a smaller diameter than the disc-shaped plate 1700. As such, when the inlet flange 1914 of the downstream pipe 1916 is coupled to the outlet flange 1912 of the noise attenuator 1900, a face 1926 of the inlet flange 1914 engages the second side 1714 of the disc-shaped plate 1700. As a result, the outer peripheral region of the disc-shaped plate 1700 is clamped between the outlet flange 1912 of the body 1902 and the inlet flange 1914 of the downstream pipe 1916. This clamping prevents radial and axial displacement of the disc-shaped plate 1700. In some examples, the shoulder 1920 and the face 1926 are in direct contact with the disc-shaped plate 1700. In other examples, one or more spacers may be disposed between the shoulder 1920 and the disc-shaped plate 1700 and/or the face 1926 and the disc-shaped plate 1700.

In the illustrated example, the recess 1918 is the same thickness or depth as the disc-shaped plate 1700. This helps prevents leaking that could potentially occur between the sector-shaped plates 1702-1708 in the radial direction. Also, compared to known attenuators, this design also eliminates the need for an end plate o-ring to seal against the body 1902, and/or end plate bolts to be secured on the body 1902.

Further, as disclosed above, the mating features of the sector-shaped plates 1702-1708 (FIG. 17) prevent the sector-shaped plates 1702-1708 from being axially displaced and/or otherwise collapsing under pressure by the flow of fluid across the disc-shaped plate 1700. The mating features may be designed to prevent axial separation in the upstream direction, the downstream direction, or both. Therefore, the example disc-shaped plate 1700 does not require threaded fasteners or support structures (e.g., a central shaft, a support frame, etc.). In this example, the disc-shaped plate 1700 is only supported by clamping of the outer peripheral region of the disc-shaped plate 1700. Eliminating the need for fasteners eliminates many drawbacks experienced with fasteners. For example, fasteners may need to be re-tightened as they become loose overtime. Fasteners also often require support structures. Further, fasteners create limited joint surfaces that carry high stresses. On the other hand, the example mating feature design provides larger, lower-stress joint surfaces. Further, assembly is easier without the fasteners, because the disc-shaped plate 1700 can be easily inserted into the recess 1918 before coupling the outlet flange 1912 of the body 1902 to the inlet flange 1914 of the downstream pipe 1916. This reduces costs associated with assembling the noise attenuator 1900. Further, because the disc-shaped plate 1700 is sized to fit a specific recess, the disc-shaped plate 1700 can be made as thick as structurally required, thereby eliminating the need for adjacent support structures.

In other examples, the sector-shaped plate 1702-1708 may be coupled or supported by fasteners or a support structure, such as in the case of remote assembly or temporary shelf storage (outside of the body 1902). In some examples, the plate-to-plate interfaces may be reinforced with glue, a bonding element, fasteners, or an outer holding ring.

In the illustrated example, the noise attenuator 1900 includes additional plates 1930, 1932 (sometimes referred to as internal plates) disposed in the fluid passageway 1904 upstream of the disc-shaped plate 1700. In the illustrated example, the plates 1930, 1932 are coupled via a plurality of rods 1934 (one of which is referenced in FIG. 19) that prevent or reduce bending of the plates 1930, 1932. The plates 1930, 1932 include openings defining flow paths through the respective plates 1930, 1932 to attenuate noise. The plates 1930, 1932 incrementally slow and reduce noise of the flow fluid. In this example, the rods 1934 are not coupled to the disc-shaped plate 1700. Thus, in this example, the disc-shaped plate 1700 (e.g., the end plate) is not coupled to the plates 1930, 1932 (e.g., the internal plates). In other examples, the rods 1934 may extend to and be coupled to the disc-shaped plate 1700. Additionally or alternatively, in some examples, one or more spacers may be disposed between each of the plates 1930, 1932 and/or between the plate 1932 and the disc-shaped plate 1700. For example, FIG. 19 shows an example spacer 1936 disposed between the plate 1932 and the disc-shaped plate 1700. As such, upstream pressured loads from the plates 1930, 1932 are transferred to the disc-shaped plate 1700 via the spacer 1936. In other examples, more spacers may be used. In other examples, spacers may not be disposed between the plate 1938 and the disc-shaped plate 1700. In other examples, more or fewer plates may be implemented. In this example, each of the plates 1930-1938 is a single piece perforated metal plate. However, in other examples, one or more of the plates 1930-1938 may be the same as the disc-shaped plate 1700. Thus, multiple ones of the disc-shaped plate 1700 may be implemented. Separation distance between the plates can be achieved by axial spacers, bore steps, nuts, etc. In other examples, the noise attenuator 1900 may not include any internal plates, such that the disc-shaped plate 1700 may be the only plate implemented in the noise attenuator 1900.

Figure 20:
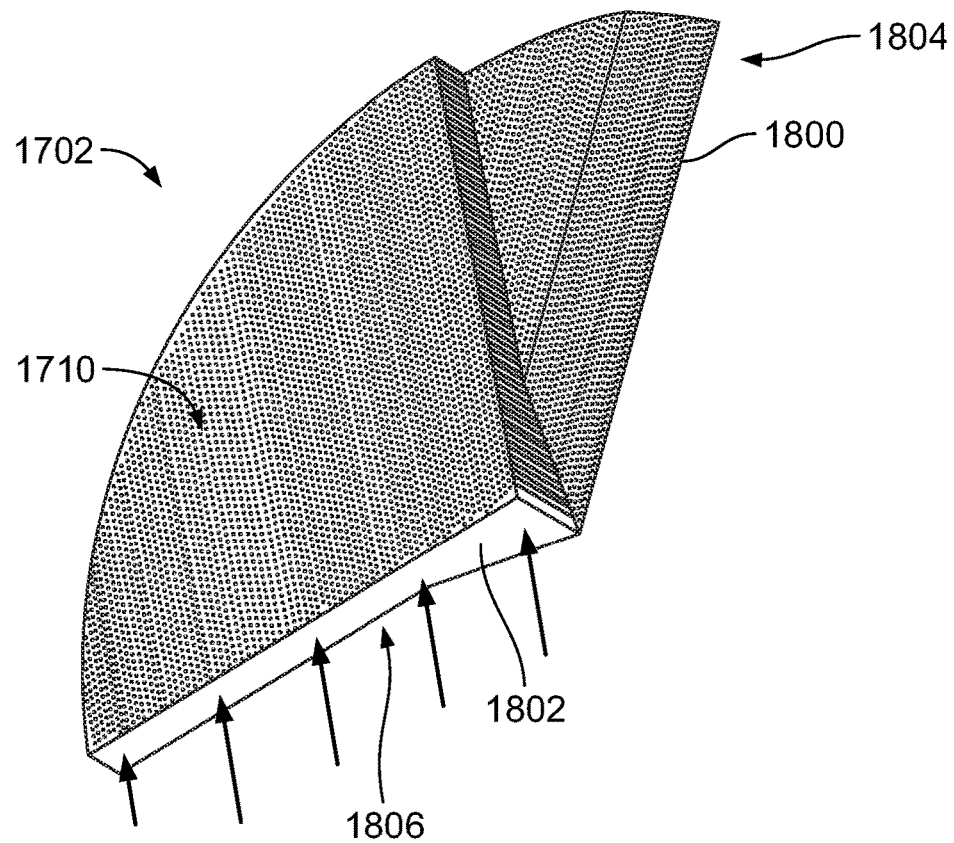
FIG. 20 is a perspective view of a first one of the example sector-shaped plates of FIG. 17.
Figure 21:
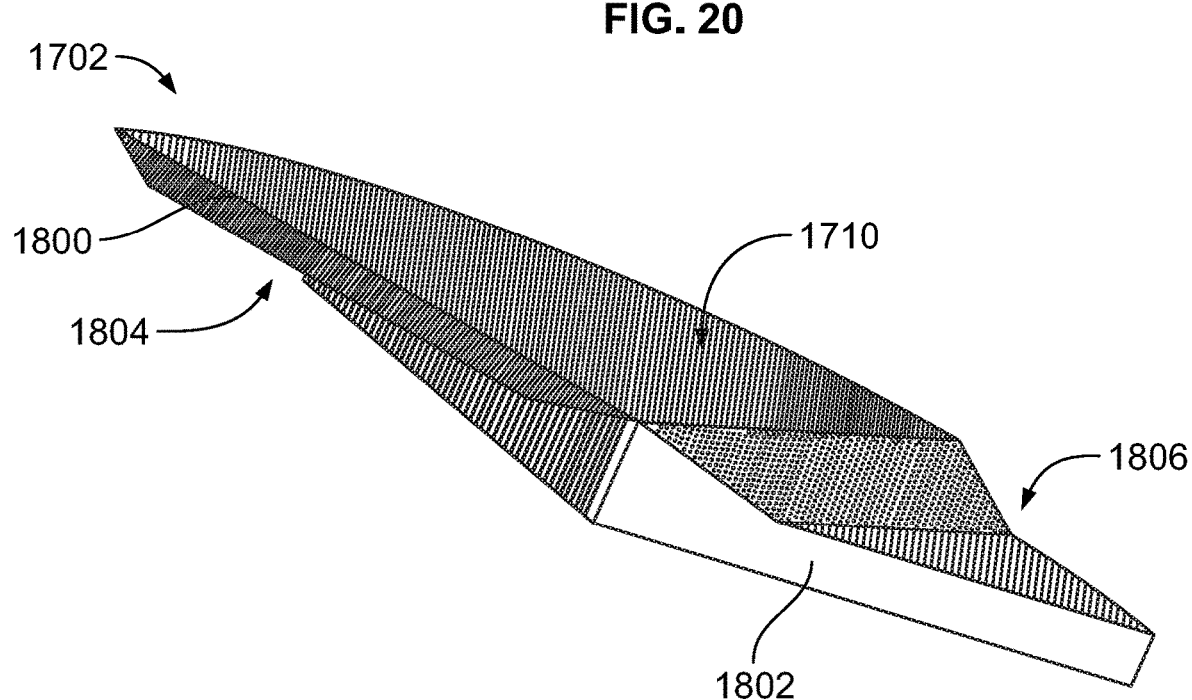
FIG. 21 is another perspective view of the example sector-shaped plate of FIG. 20.

FIGS. 20 and 21 are perspective views of the first sector-shaped plate 1702. The first sector-shaped plate 1702 has the first radial edge 1800 forming the first mating feature 1804 and the second radial edge 1802 forming the second mating feature 1806. As disclosed above, in some examples, the first sector-shaped plate 1702 is constructed by a 3D printer, such as the 3D printer 600 of FIG. 6. In some examples, the first sector-shaped plate 1702 is printed in a vertical orientation, starting with the radial second edge 1802, as shown by the direction of the arrows in FIG. 20. This enables multiple sectors-shaped plates to be printed side-by-side during the same print batch, similar to the arrangement shown in FIG. 6. In some examples, this results in the openings 1710 being tear-dropped shaped, similar to the opening 316 shown in FIG. 7A. In other examples, the openings 1710 may be shaped differently. In other examples, the first sector-shaped plate 1702 may be printed in a different orientation (e.g., horizontal).

In some examples, the flow paths formed by the openings 1710 are not uniformly shaped, but may have variable areas and section profiles between the upstream face (e.g., the first side 1712 (FIG. 17)) and the downstream face (e.g., the second side 1714 (FIG. 17)) of the disc-shaped plate 1700. For example, in acoustic applications, one or more of the openings 1710 may have two or more expansion stages, which improves noise reduction. In another example, where only one expansion stage is implemented, a first portion (e.g., 80%) of a flow path may be formed by a larger hole, followed by a smaller hole at the downstream face.

Figure 22:
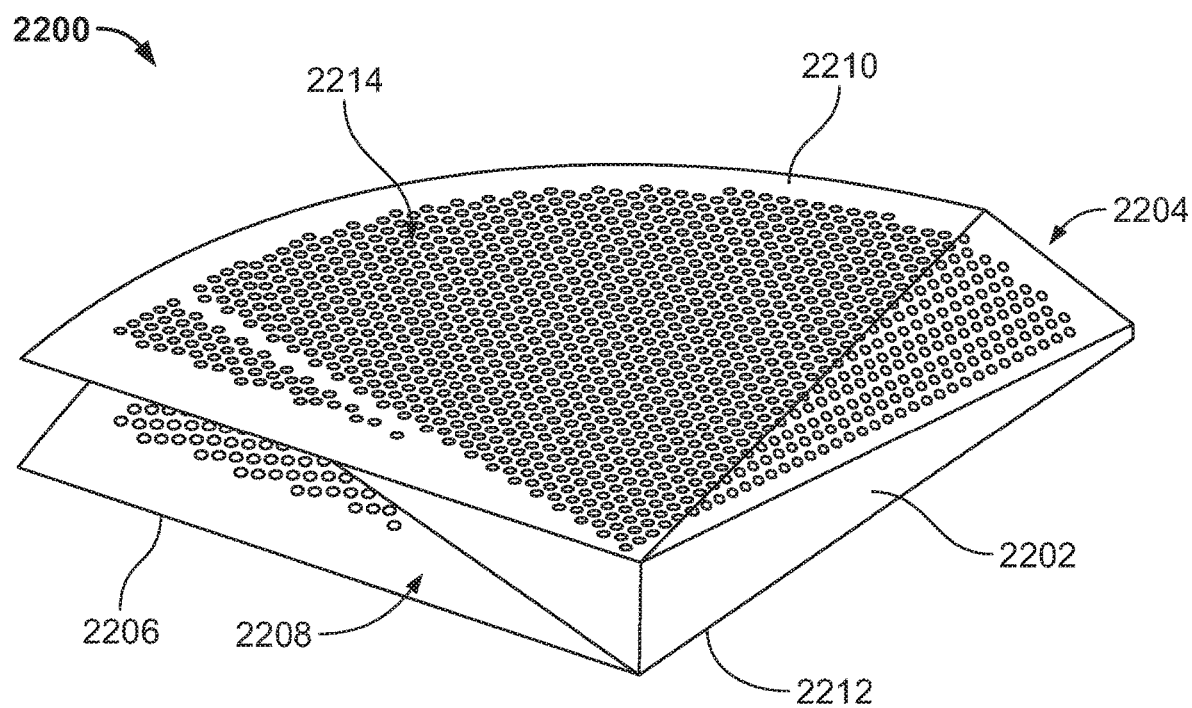
FIG. 22 is a perspective view of an example sector-shaped plate that may be used to form a disc-shaped plate that may be implemented in a noise attenuator.
Figure 27:
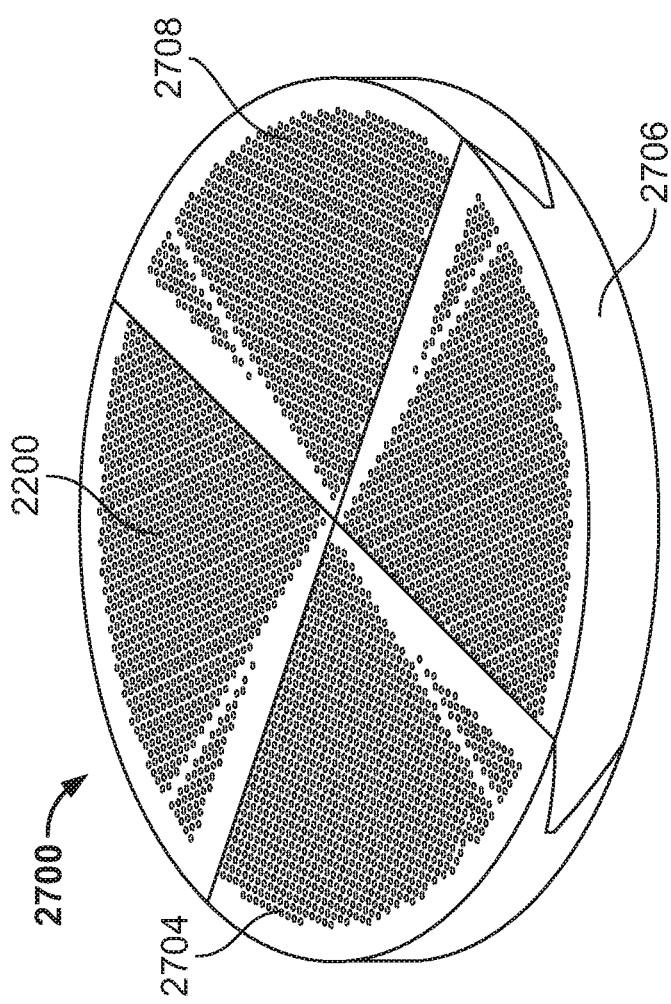
FIG. 27 is a perspective view of an example disc-shaped plate formed by a plurality of example sector-shaped plates corresponding to example the sector-shaped plate of FIG. 22.

FIG. 22 is a perspective view another example sector-shaped plate 2200 that may be used to form a disc-shaped plate for a noise attenuator, similar to the sector-shaped plates 1702-1708 disclosed above. Multiple ones of the sector-shaped plate 2200 may be constructed and arranged together to form a disc-shaped plate. In particular, in this example, four of the sector-shaped plates 2200 may be arranged together to form a disc-shaped plate, an example of which is shown in FIG. 27. The resulting disc-shaped plate may be disposed in a fluid passageway similar to the disc-shaped plate 1700 shown in FIG. 19. The sector-shaped plate 2200 may be printed via a 3D printer, such as the printer 600 of FIG. 6.

In the illustrated example, the sector-shaped plate 2200 has a first radial edge 2202 forming a first mating feature 2204 and a second radial edge 2206 forming a second mating feature 2208 that is complementary to the first mating feature 2204. In this example, the first mating feature 2204 is a v-shaped wedge, and the second mating feature 2208 is a v-shaped groove. When four of the sector-shaped plates 2200 are assembled into a disc-shaped plate, the first mating feature 2204 of each of the sector-shaped plates 2200 engages or mates with the second mating feature 2208 of an adjacent one of the sector-shaped plates 2200. As such, each of the sector-shaped plates 2200 overlaps in an axial direction with two adjacent ones of the sector-shaped plates 2200. This mating design prevents the sector-shaped plates 2200 from being axially displaced or moved under high pressure of the fluid flow.

In the illustrated example, the sector-shaped plate 2200 has a first wall 2210 forming a first side of the sector-shaped plate 2200 and a second wall 2212 forming a second side of the sector-shaped plate 2200. The sector-shaped plate 220 has a first plurality of openings 2214 (one of which is reference in FIG. 22) extending between the first and second walls 2210, 2212. The openings 2214 form flow paths through the sector-shaped plate 2200 to attenuate noise.

Figure 23:
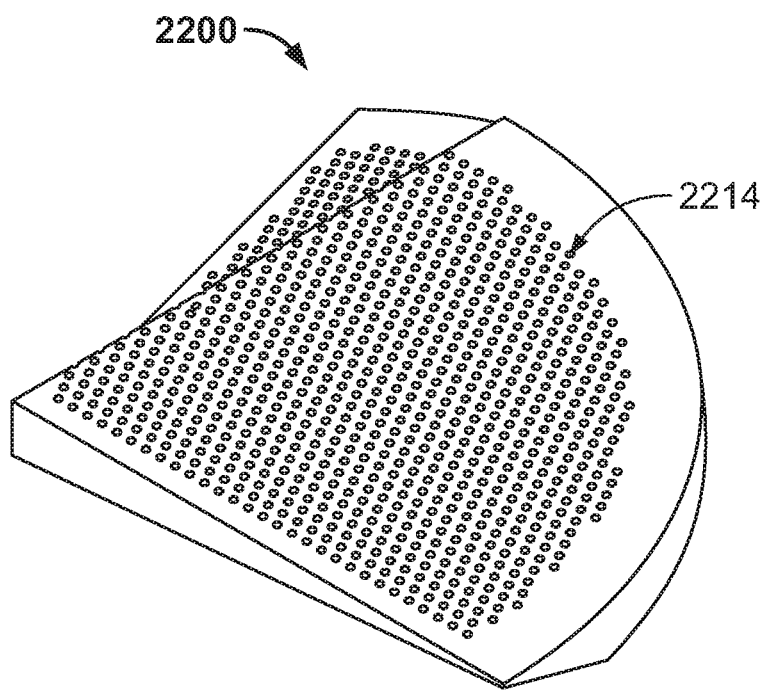
FIG. 23 is a perspective cross-sectioned view of the example sector-shaped plate of FIG. 22 showing an example in which the internal body of the example sector-shaped plate is substantially solid.

In some examples, the sector-shaped plate 2200 is substantially solid, and the openings 2214 extend through the body of the sector-shaped plate 2200. For example, FIG. 23 shows an example of the sector-shaped plate 2200 that been cross-sectioned along a center plane of the sector-shaped plate 2200. In this example, the internal body of the sector-shaped plate 2200 is substantially solid and the openings 2214 (one of which is referenced in FIG. 23) extend through the solid body.

Figure 24:
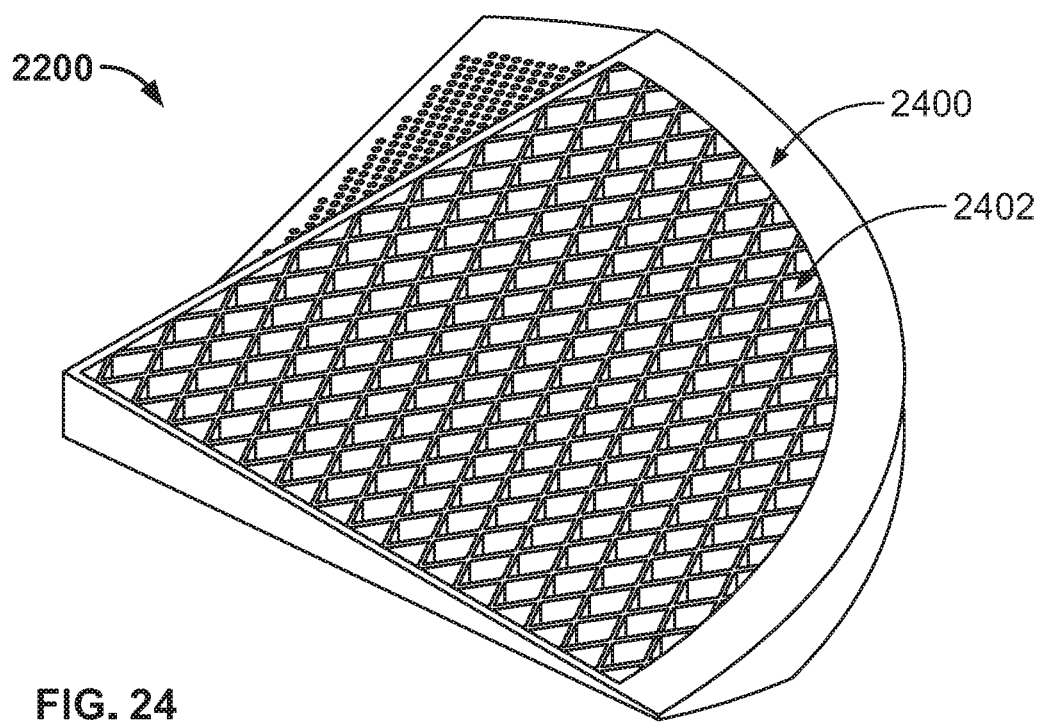
FIG. 24 is a perspective cross-sectioned view of the example sector-shaped plate of FIG. 22 showing an example in which the internal body of the sector-shaped plate has an example internal lattice structure.
Figure 25:
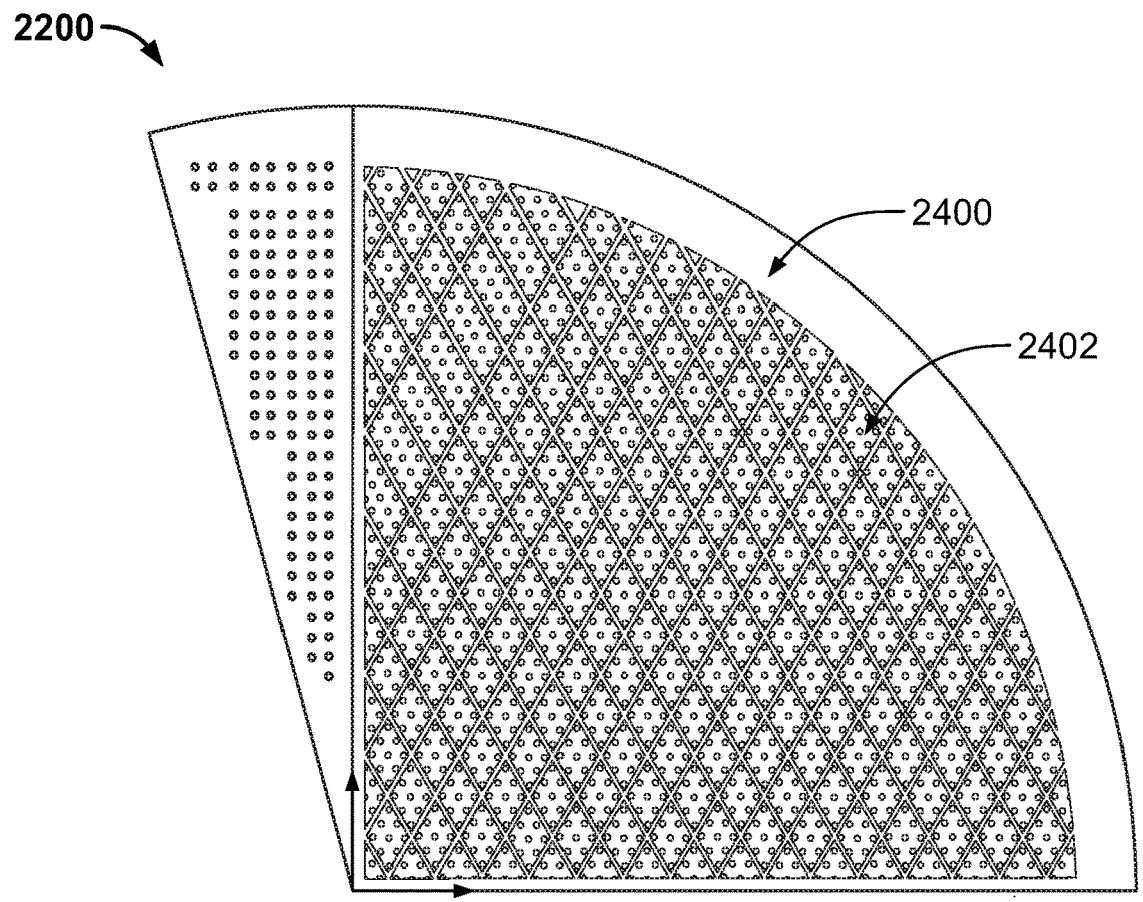
FIG. 25 is a top view of the example sector-shaped plate of FIG. 24 with the example internal lattice structure.

In other examples, the internal body of the sector-shaped plate 2200 may be partially hollow or include another structure, such as a lattice structure. For example, FIG. 24 shows another cross-sectioned version of the sector-shaped plate 2200. In this example, the inside of the sector-shaped plate 2200 has an internal lattice structure 2400. The internal lattice structure 2402 forms a plurality of openings 2402 (one of which is referenced in FIG. 24). In this example, the openings 2402 are diamond shaped. In some examples, this diamond shaped lattice structure allows for easier printing in the vertical direction by limiting wall overhang. In other examples, the internal lattice structure 2400 may form differently shaped openings (e.g., squares, triangles, hexagons, octagons, etc.). FIG. 25 is a top view of the sector-shaped plate 2200 of FIG. 24 showing the internal lattice structure 2400 and the openings 2402. The openings 2402 fluidly connect the openings in the first and second walls 2210, 2212 (FIG. 22). In the illustrated example, the openings 2402 of the internal lattice structure 2400 are larger than the openings in the first and second walls 2210, 2212. Therefore, each of the openings 2402 of the internal lattice structure 2400 fluidly connects multiple ones of the openings in the first and second walls 2210, 2212.

Figure 26:
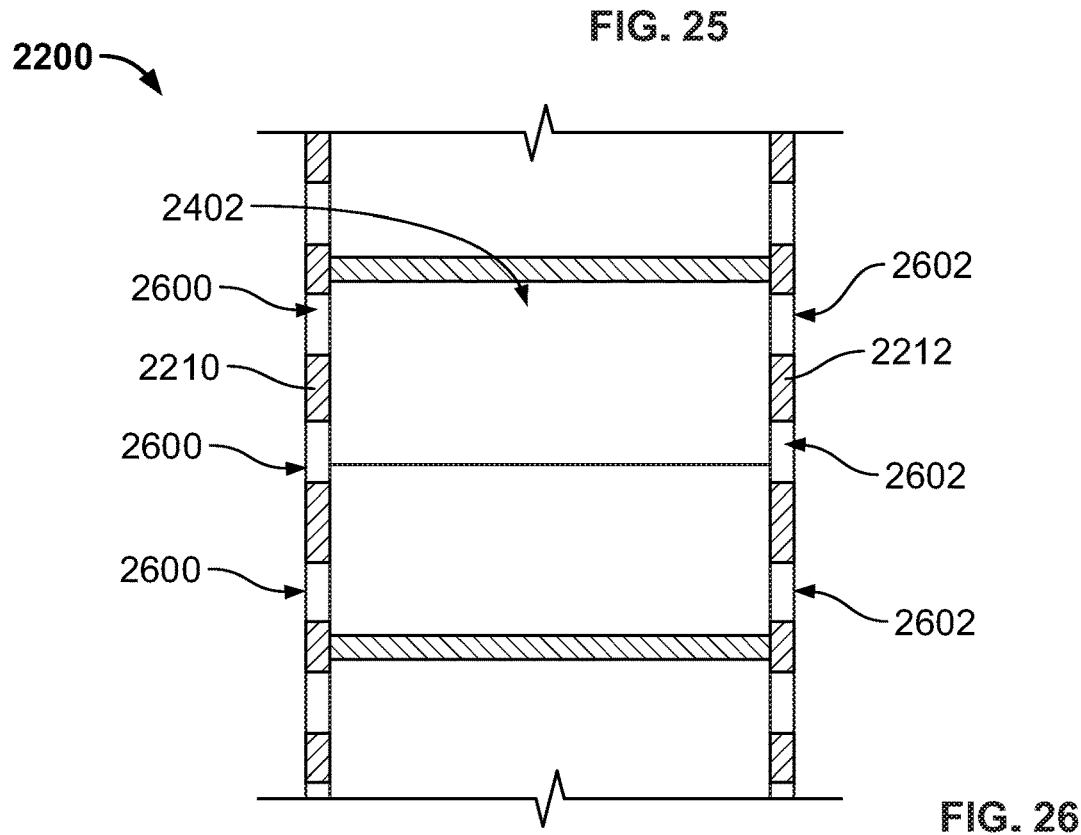
FIG. 26 is a side cross-sectional view of the example sector-shaped plate of FIG. 24 showing an opening of the example internal lattice structure.

FIG. 26 is a side cross-sectional view of the sector-shaped plate 2200 showing one of the openings 2402 of the internal lattice structure 2400. The first wall 2210 has a first plurality of openings 2600 (three of which are referenced in FIG. 26) and the second wall 2212 has a second plurality of openings 2602 (three of which are referenced in FIG. 26). The opening 2402 of the internal lattice structure 2400 fluidly connects a set of the first plurality of openings 2600 and a set of the second plurality of openings 2602. In some examples, the internal lattice structure 2400 is formed through the entire sector-shaped plate 2200, including the portions forming the first and second mating features 2204, 2208. In other examples, the internal lattice structure 2400 is only formed in the center or main portion of the sector-shaped plate 2200, whereas the portions forming the first and second mating features 2204, 2208 do not include an internal lattice structure.

The example internal lattice structure 2400 reduces the amount of material used to build the sector-shaped plate 2200. In other words, the sector-shaped plate 2200 contains less material than a sector-shaped plate having a solid internal structure. As such, the sector-shaped plate 2200 is less expensive to manufacture and results in a lighter disc-shaped plate. As disclosed above, the sector-shaped plate 2200 can be constructed by a 3D printer. The internal lattice structure 2400 can be formed during the 3D printing process. Such an internal lattice structure may not be feasible via a traditional (subtractive) machining process.

Further, with this design, the first and second walls 2210, 2212 effectively form two attenuator plates. For example, the first wall 2210 has the first plurality of openings 2600 and the second wall 2212 has the second plurality of openings 2602. Thus, this design results in two flow stages (dual expansion), which further improves the noise attenuating performance of the sector-shaped plate 2200. The first and second walls 2210, 2212 can be thinner or thicker depending on the structural loading demands.

In some examples, instead of having an internal lattice structure, the internal section of the sector-shaped plate may be completely hollow. In some examples, one or more portions of a disc-shaped plate may include a hollow section or a lattice structure, while one or more other portions may be solid. In another example, the entire sector-shaped plate may be a lattice structure, and no side walls are used. In such an example, the flow paths have constant cross-sections across the plate thickness, defined by the lattice geometry. It is understood that any of the example disc-shaped plates and/or individual sector-shaped plates disclosed herein may include an internal lattice structure or variations thereof as disclosed in connection with this example.

FIG. 27 is a perspective view of an example disc-shaped plate 2700 formed by the sector-shaped plate 2200 (also referred to herein as the first sector-shaped plate 2200) and three other sector-shaped plates 2704-2708 (referred to as the second, third, and fourth sector-shaped plates 2704-2708). The second, third, and fourth sector-shaped plates are the same (i.e., have the same size and shape) as the first disc-shaped plate 2200, and may also be printed via a 3D printer, such as the 3D printer 600 of FIG. 6. The disc-shaped plate 2700 may be disposed in a fluid passageway similar to the disc-shaped plate 1700 shown in FIG. 19.

When the sector-shaped plates 2200, 2704-2708 are assembled into the disc-shaped plate 2700, the first mating feature 2204 (FIG. 2) of each of the sector-shaped plates 2200, 2704-2708 engages or mates with the second mating feature 2208 (FIG. 2) of an adjacent one of the sector-shaped plates 2200, 2704-2708. As such, each of the sector-shaped plates 2200, 2704-2708 overlaps in an axial direction with two adjacent ones of the sector-shaped plates 2200, 2704-2708. This mating design prevents the sector-shaped plates 2702-2708 from being axially displaced or moved under high pressure of the fluid flow from the upstream or downstream directions. Because of the v-shaped overlap, an isolated point force would not cause one of the sector-shaped plates 2200, 2704-2708 to rotate or twist in this example. The intra-locking design of the mating features 2204, 2208 (FIG. 22) prevents twisting in both directions (radially outward moment, and radially inward moment), thereby preventing collapse between the sector-shaped plates 2200, 2704-2708.

Figure 28A:
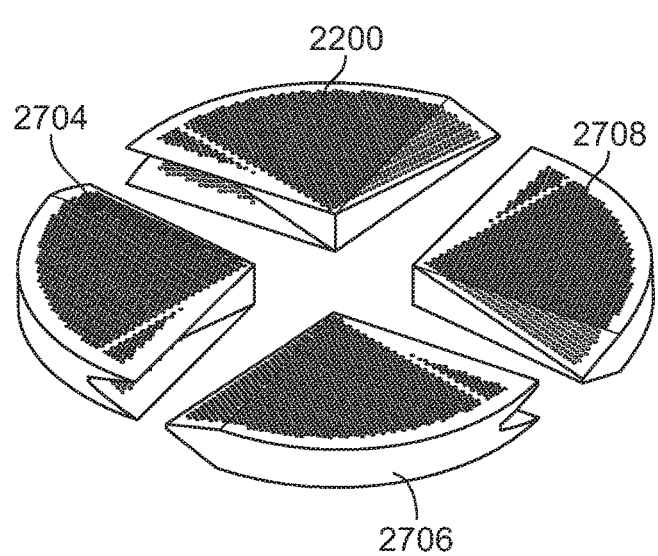
FIGS. 28A-28D show an example sequence of assembling the plurality of example sector-shaped plates to form the example disc-shaped plate of FIG. 27.
Figure 28B:
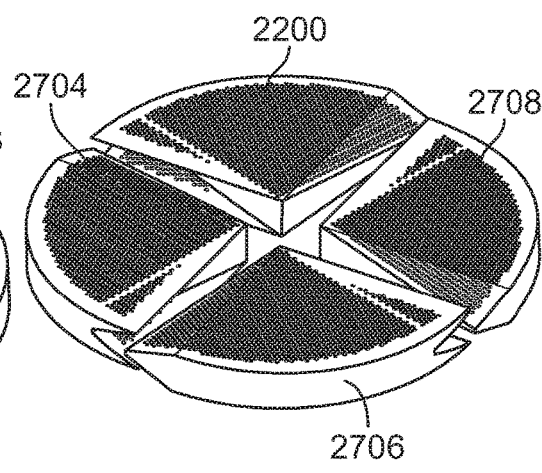
Figure 28C:
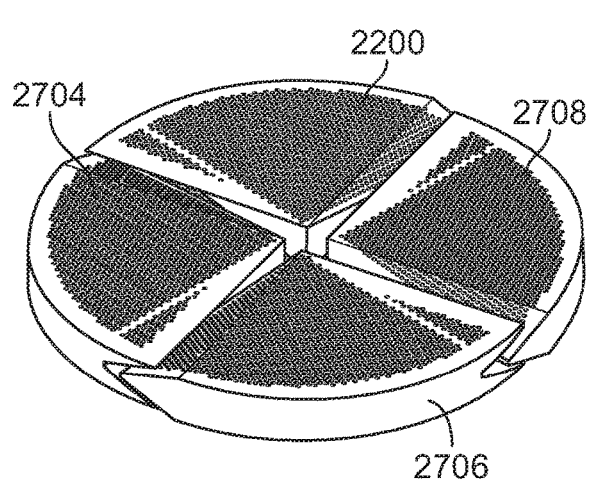
Figure 28D:
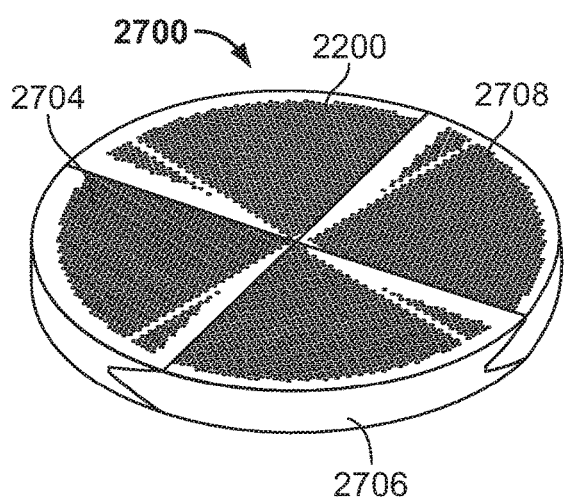

FIGS. 28A, 28B, 28C, and 28D show an example sequence of assembling the sector-shaped plates 2200, 2704-2708 into the disc-shaped plate 2700 (FIG. 28D). The sector-shaped plates 2200, 2704-2708 may be laid on a flat surface radially spread apart. Then, the sector-shaped plates 2200, 2704-2708 may be pushed radially inward until all of the sector-shaped plates 2200, 2704-2708 mate.

Figure 29:
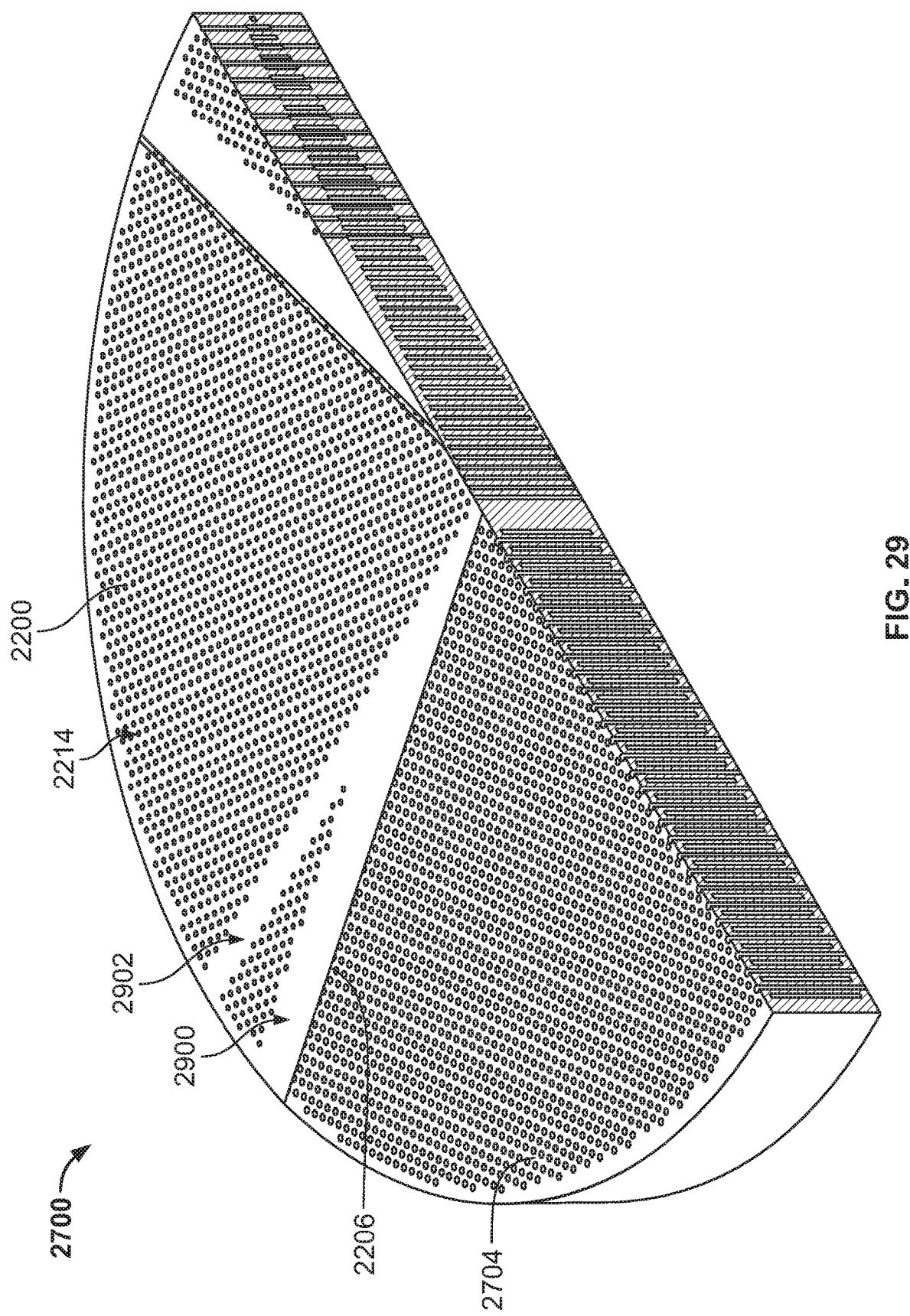
FIG. 29 is a perspective cross-sectional view of the example disc-shaped plate of FIG. 27 showing example openings extending through the example disc-shaped plate.

In some examples, each of the sector-shaped plates 2200, 2704-2708 may include an internal lattice structure, as disclosed in connection with FIGS. 24-26. In other examples, the sector-shaped plates 2200, 2704-2708 may not include an internal lattice structure. Instead, the openings may extend straight through the respective sector-shaped plates 2200, 2704-2708, as disclosed in connection with FIG. 23. For example, FIG. 29 shows a cross-sectional view of the example disc-shaped plate 2700 in which the disc-shaped plate 2700 does not include an internal lattice structure. Instead, the openings 2214 extend through the solid internal structure of the disc-shaped plate 2700.

In some examples, the openings 2214 are omitted from one or more sections of the sector-shaped plates 2202, 2704-2708 near the interfaces of the first and second mating features 2204, 2208 (FIG. 22). In some examples, this interface is relatively thin. For example, as shown in FIG. 29, a first section 2900 along the second radial edge 2206 of the first sector-shaped plate 2200 does not include openings. Also, a second section 2902 does not include openings. The second section 3202 corresponds to the radial edge forming the first mating feature of the second sector-shaped plate 2704. In other examples, one or more of these sections may still have openings.

Figure 30:
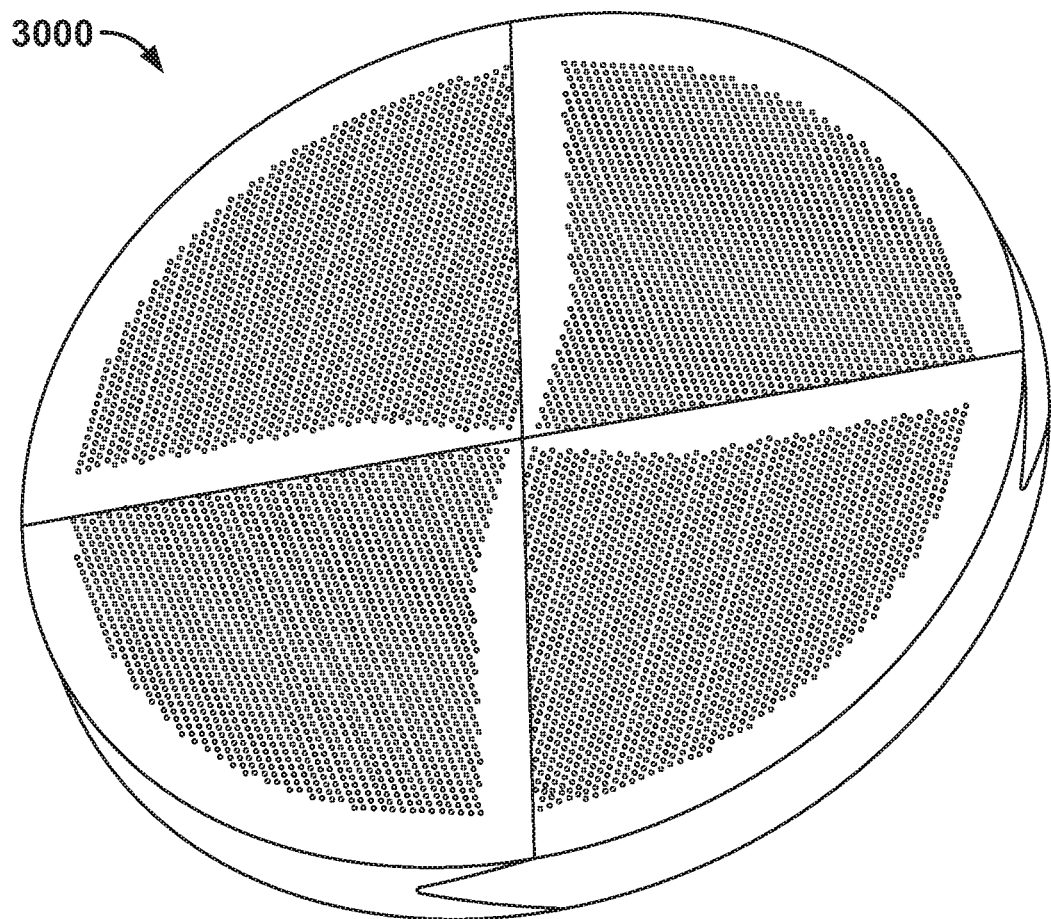
FIG. 30 is a perspective view of an example disc-shaped plate formed by a plurality of example sector-shaped plates that may be implemented in a noise attenuator.
Figure 31:
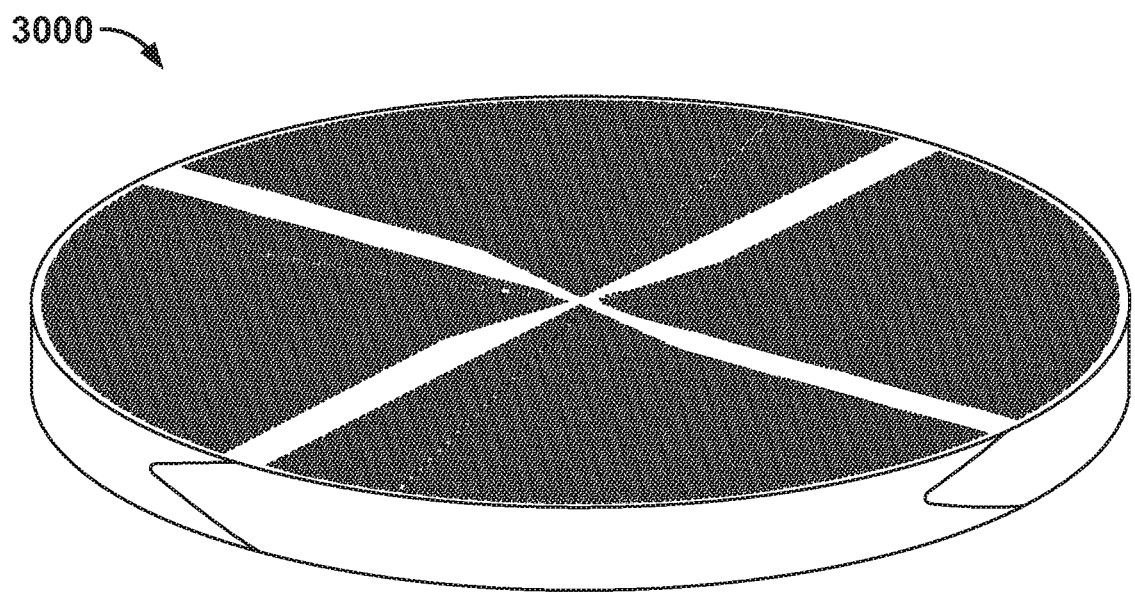
FIG. 31 shows the example disc-shaped plate of FIG. 30 with a first side removed.
Figure 32:
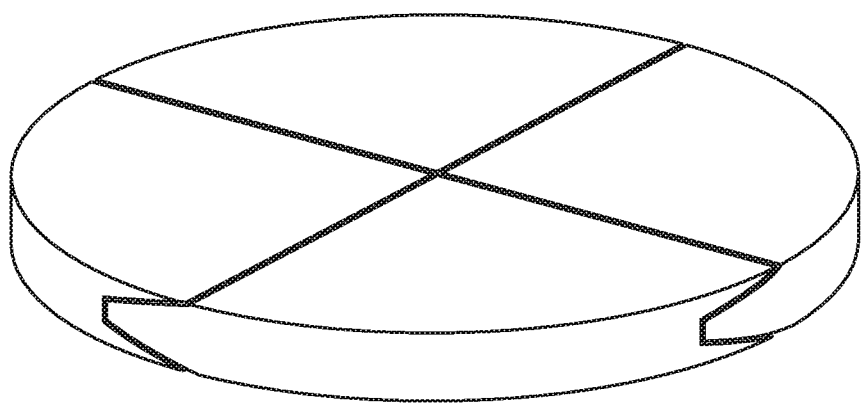
FIGS. 32-43 are perspective views of example disc-shaped plates having various shaped sector-shaped plates that may be implemented in a noise attenuator.
Figure 33:
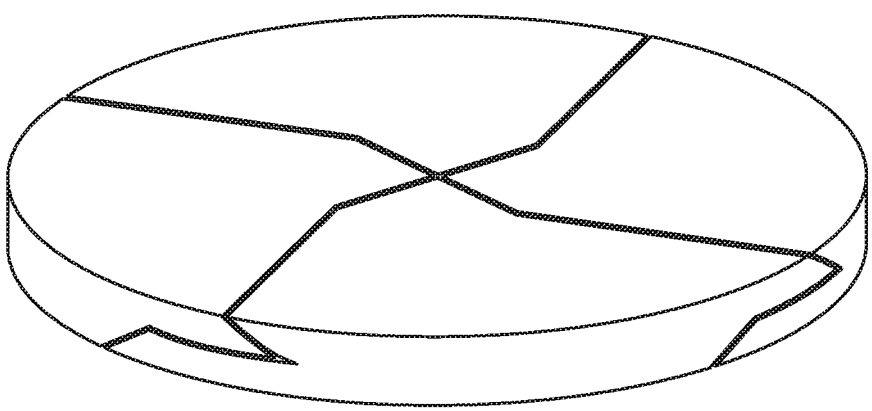
Figure 34:
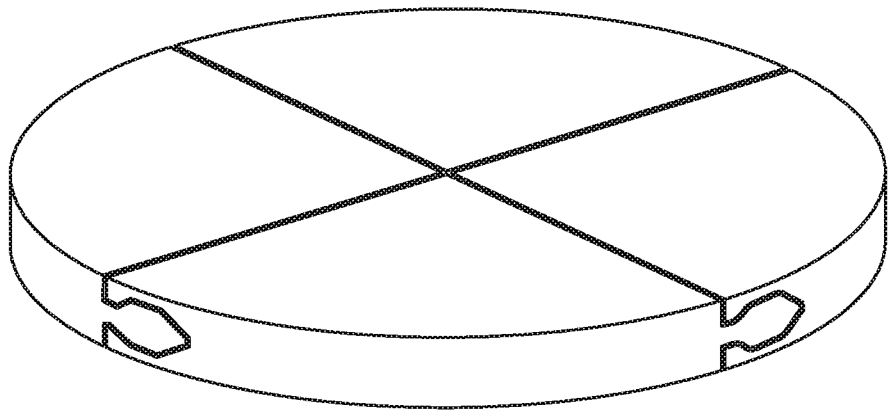
Figure 35:
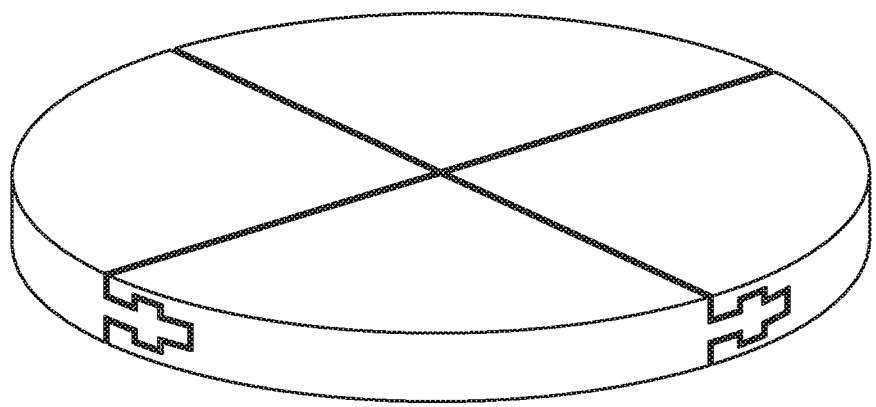
Figure 36:
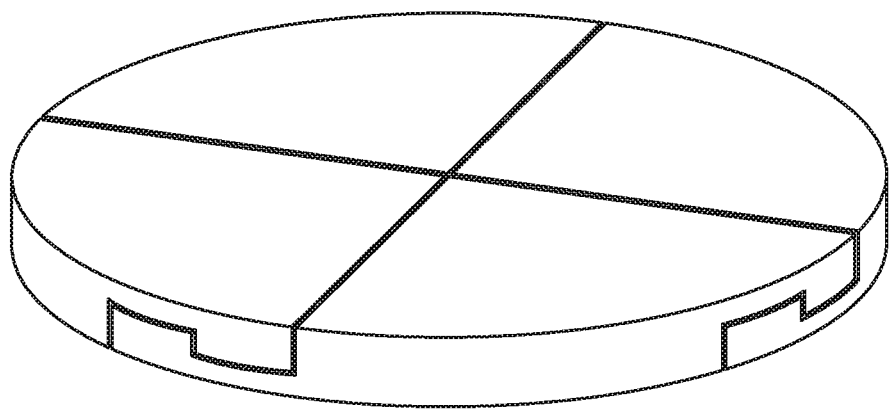
Figure 37:
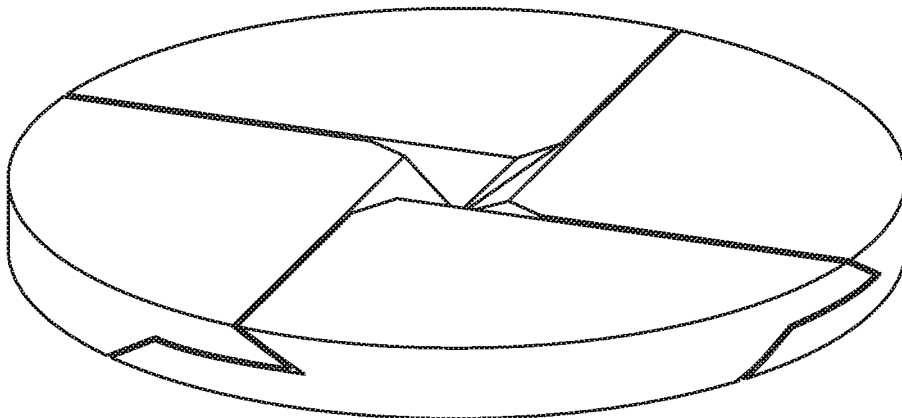
Figure 38:
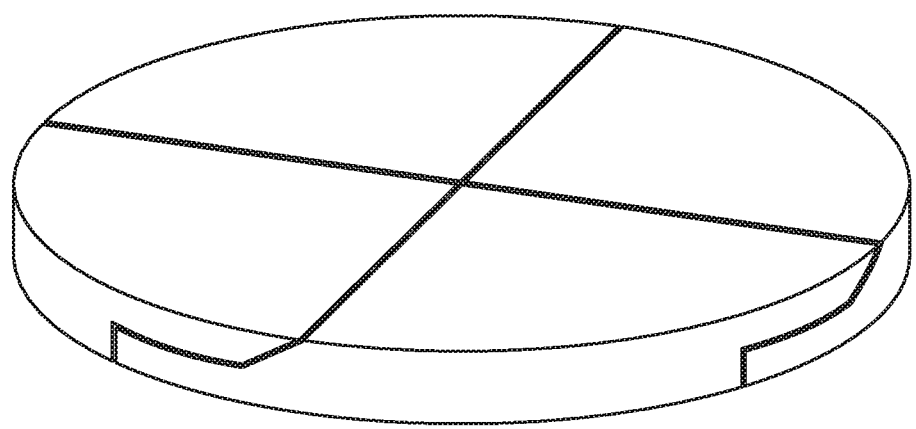
Figure 39:
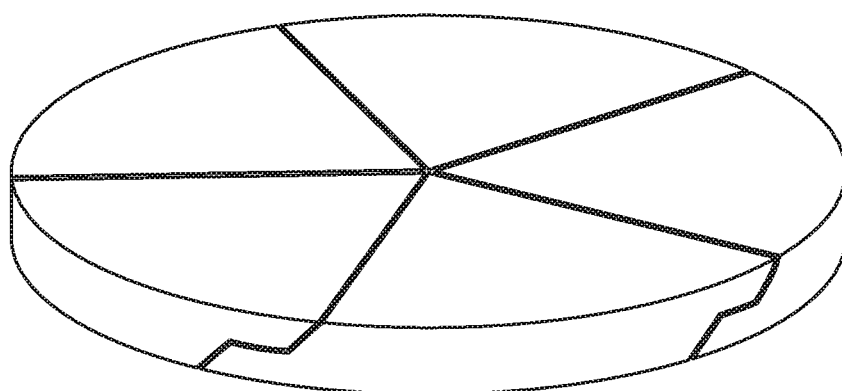
Figure 40:
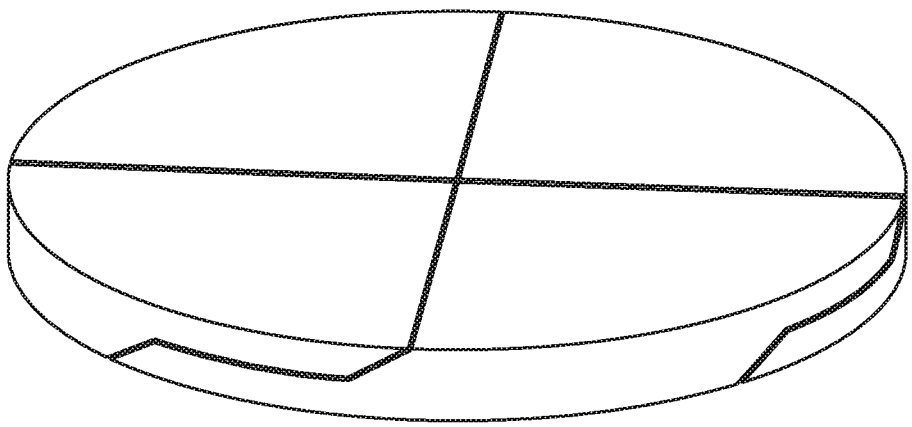
Figure 41:
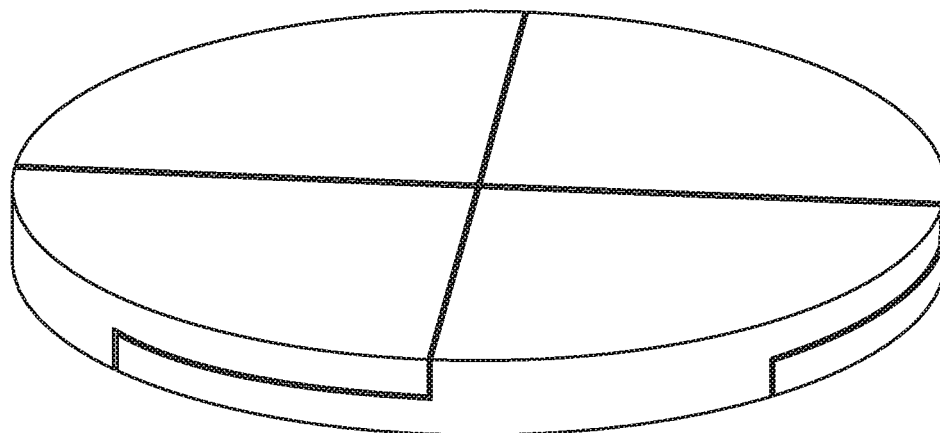

For example, FIG. 30 is a perspective view of another example disc-shaped plate 3000. The disc-shaped plate 3000 is substantially the same as the disc-shaped plate 2700 disclosed above. However, in this example, the disc-shaped plate 3000 does not include the section 2902 of omitted openings. FIG. 31 shows the disc-shaped plate 3000 with the first wall removed.

FIGS. 32-43 illustrate example disc-shaped plates having various shaped mating features. The mating features function substantially the same as the examples disclosed above to prevent or reduce axial displacement of the sector-shaped plates. In some examples, the mating features not only overlap in the axial direction, but also overlap in the circumferential direction. Therefore, engagement may occur in specific directions.

The openings through the respective disc-shaped plates are not shown in FIGS. 32-43. However, it is understood that the disc-shaped plates of FIGS. 32-43 may include a plurality of openings extending through the respective disc-shaped plates. Any of the disc-shaped plates of FIGS. 32-43 may include internal lattice structure, similar to the internal lattice structure in the examples disclosed above. Each of the disc-shaped plates is formed by a plurality of sector-shaped plates. Any number of sector-shaped plates may be utilized. The sector-shaped plates may be printed in a 3D printer, such as the 3D printer 600 of FIG. 6. Some of the disc-shaped plates of FIGS. 32-43 are more suitable for machining operations because of complex printing. Any of the disc-shaped plates of FIGS. 32-43 may be disposed in a fluid passageway similar to the disc-shaped plate 1700 shown in FIG. 19.

Figure 42:
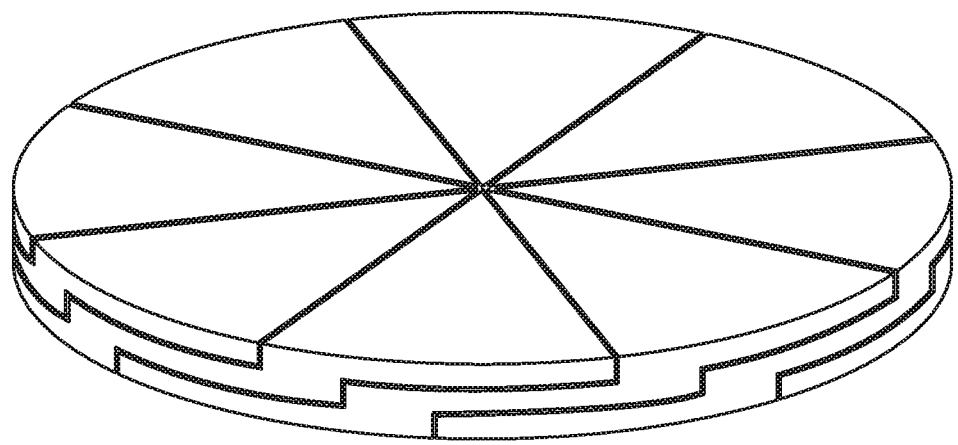
Figure 43:
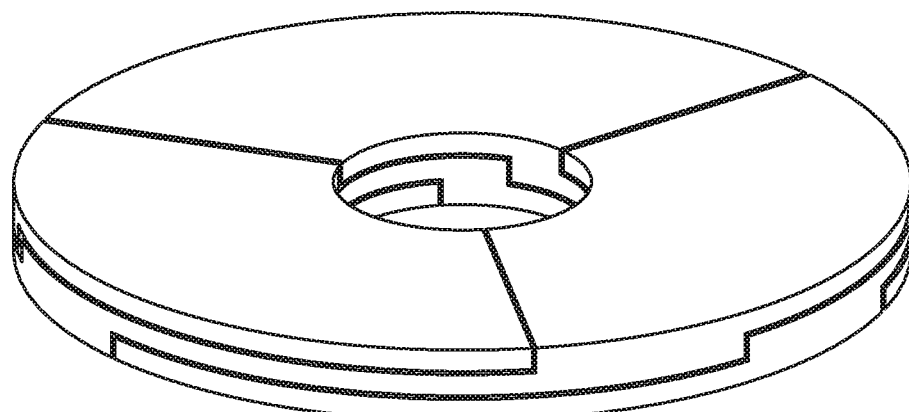

In some of the examples, such as in FIGS. 42 and 43, the sector-shaped plates overlap in the axial direction with two other ones of the sector-shaped plates at the mating features. In other examples, the sector-shaped plates may be designed such that the sector-shaped plates overlap in the axial direction with more than two other ones of the other sector-shaped plates at the mating features. In some examples, such as in FIGS. 37 and 43, a disc-shaped plate may have a groove or opening in the center. This groove or opening may be used to receive a support member, such a central rod. In some examples, a disc-shaped plate may include additional openings to receive other support rods for supporting the disc-shaped plate. A disc-shaped plate may have regions that are fully solid or with thicker walls if supporting rods or spacers are utilized.

Figure 44:
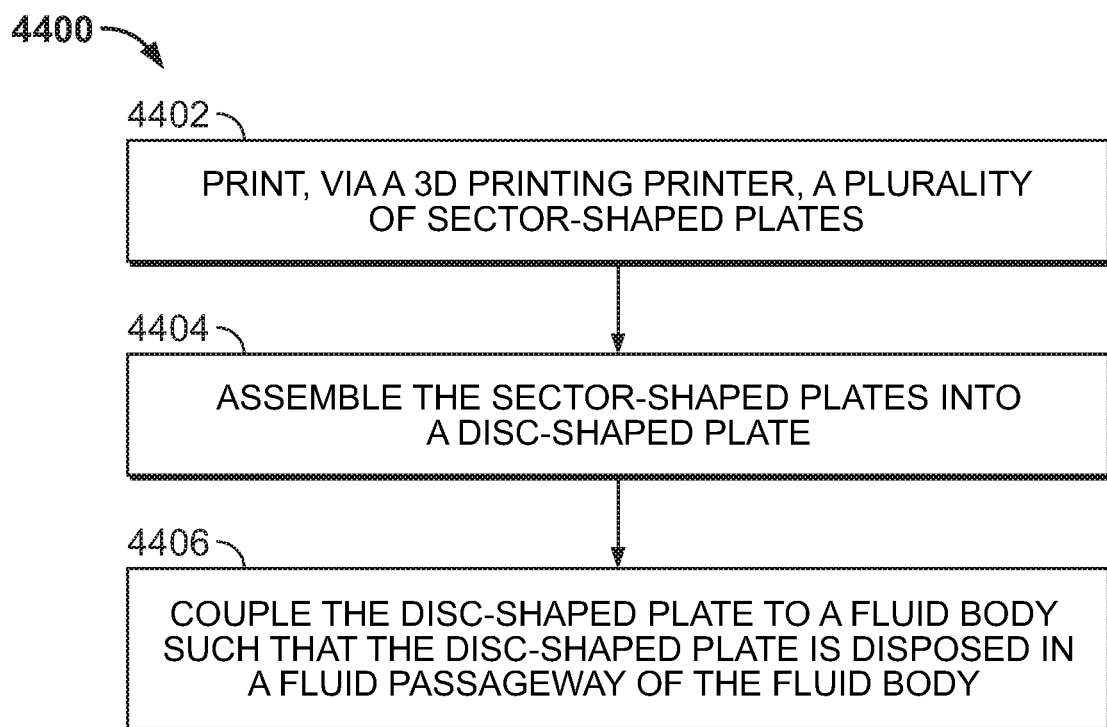
FIG. 44 is a flowchart representative of an example method of manufacturing an example disc-shaped plate and installing the example disc-shaped plate in a fluid body.

FIG. 44 is a flowchart representative of an example method 4400 of manufacturing a disc-shaped plate and installing the disc-shaped plate in a fluid body. The example method 4400 is described in connection with the disc-shaped plate 1700 of FIG. 17. However, it is understood that the example method 4400 may be similarly performed in connection with any of the example disc-shaped plates disclosed herein.

At block 4402, the example method 4400 includes printing, via a 3D printer, a plurality of sector-shaped plates. For example, the sector-shaped plates 1702-1708 may be printed via a 3D printer, such as the 3D printer 600 of FIG. 6. In some examples, each of the sector-shaped plates 1702-1708 is printed in a vertical orientation. This enables multiple sector-shaped plates to be printed side-by-side in the same print batch. The sector-shaped plate 1702-1708 may be printed simultaneously as part of the same print batch or at different times. In some examples, one or more post-machining operations (e.g., drilling, cutting, sanding, etc.) may be performed to smooth the surfaces of the sector-shaped plates 1702-1708. Each of the sector-shaped plates 1702-1708 includes the first mating feature 1804 and the second mating feature 1806 that is complementary to the first mating feature 1804. The sector-shaped plates 1702-1708 include the openings 1710. In some examples, the sector-shaped plates 1702-1708 may include an internal lattice structure.

At block 4404, the example method 4400 includes assembling the sector-shaped plates into a disc-shaped plate. For example, the sector-shaped plates 1702-1708 may be laid on a flat surface, radially spaced apart, and then moved radially inward toward each other. The mating features engage or mate with corresponding mating features of the adjacent sector-shaped plates 1702-1708.

At block 4406, the example method 4400 includes coupling the disc-shaped plate to a fluid body such that the disc-shaped plate is disposed in a fluid passageway of the fluid body. For example, as shown in FIG. 19, the disc-shaped plate 1700 is disposed in the fluid passageway 1904 of the body 1902 of the noise attenuator 1900. In some examples, the disc-shaped plate 1700 is coupled to the body 1902 by clamping the outer peripheral region of the disc-shaped plate 1700 between the body 1902 and the downstream pipe 1916. This clamping locks the outer peripheral region of the disc-shaped plate 1700 in place. Further, the mating design prevents or reduces axial displacement of the sector-shaped plates 1702-1708. As such, in some examples, the method 4400 does not include using threaded fasteners or support structures to construct the disc-shaped plate 1700 or couple the disc-shaped plate 1700 to the body 1902. However, in other examples, fasteners or support structures may be used.

While in many of the examples disclosed herein a disc-shaped plate is coupled to or otherwise integrated with a body of a noise attenuator, any of the example plates and/or plate assemblies disclosed herein can instead be coupled to or integrated directly into a body of the process control device creating the audible noise. For example, a disc-shaped plate may be coupled to an outlet of a regulator or a valve to attenuate noise as the fluid exits the regulator or a valve.

Any of the example plates and/or plate assemblies disclosed herein can also be implemented in other devices using multi-path flow plates, such as flame arrestors. In flame arrestor applications, the flow paths can be sized with a specific Maximum Experimental Safe Gap (MESG) or hole diameter based on the process gas. In some examples, identical plates can be stacked depending on the operation parameters. In some examples, plates with identical cross-sections can be 3D printed taller or shallower depending on the application and/or media.

The example interlocking plate designs disclosed herein can also be used in other applications not related to controlling fluid flow across a plate. For example, many valves and other flow control devices have a top section with an opening that is sealed with a lid plate. If the valve requires servicing, for instance, the lid plate can be removed to access the internal section of the valve. The lid plate is typically a large plate with a flange that extends beyond the dimensions of the opening, such that the flange can be bolted to a corresponding flange on the valve body or a cap that covers the lid plate. Instead, an example disc-shaped plate formed by a plurality of sector-shaped plates with mating features can be used. In such an example, the sector-shaped plates would not have flow path openings, but instead may be completely solid. For example, an inner diameter of the opening in the valve body may have a recess, similar to the recess 1918 shown in the outlet 1908 of the body 1902 in FIG. 19, and the plurality of sector-shaped plates may be arranged into a disc-shaped plate and inserted into the recess. Then, a retainer ring or cross plate may be used to clamp or secure the outer peripheral region of the disc-shaped plate to the valve body. As such, the disc-shaped plate could be used as a lid to cap or seal off the opening. Such a disc-shaped plate with a plurality of sector-shaped plates may be easier to install and remove than the traditional lid plate. Further, this would enable larger plates to be constructed via 3D printing, which is advantageous because it can be used to create complex features in the sector-shaped plates.

While in many of the examples disclosed herein a disc-shaped plate is formed by a plurality of sector-shaped plates, in other examples, any of the example disc-shaped plates may be formed by one or more plate sections that are not sector-shaped. For example, a disc-shaped plate may be formed by a plurality of strips that, when arranged next to each other, form the disc-shaped plate. In another example, a disc-shaped plate may be formed by a center piece surrounded by radial sections.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example multi-flow path plates have been disclosed that can be advantageously used in devices such as noise attenuators and flame arrestors. Some examples disclosed herein utilize a support frame to support a plate, which enables the use of relatively thin plates. Thin plates have reduced frictional losses relative to thicker plates. Thin plates are also easier and less expensive to manufacture. Also disclosed are example plates formed by a plurality of sector-shaped plates that mate or interlock and, thus, do not require fasteners or support structures. Example plates disclosed herein may be constructed via 3D printing, which is typically more efficient than known machining processes and results in less wasted material. Further, 3D printing also enables the formation of complex mating features, relatively small openings, and lattice structures that are generally not feasible with traditional machining processes.

Example methods, apparatus, systems and articles of manufacture have been disclosed. Different aspects of the examples disclosed herein can be combined in other examples. Further examples and combinations thereof include the following.

Example 1 is a plate assembly for a noise attenuator. The plate assembly includes a support frame to be coupled to a body of the noise attenuator. The support frame has a plurality of radially extending ribs. The plate assembly also includes a disc-shaped plate having a plurality of openings forming flow paths to attenuate noise. The disc-shaped plate is coupled to the support frame such that pressure-induced loads on the disc-shaped plate are distributed to the plurality of radially extending ribs of the support frame.

Example 2 includes the plate assembly of Example 1, wherein the disc-shaped plate is formed by a plurality of sector-shaped plates coupled to the support frame. The plurality of openings are formed in the plurality of sector-shaped plates.

Example 3 includes the plate assembly of Example 2, wherein each of the plurality of sector-shaped plates is the same shape and size.

Example 4 includes the plate assembly of Examples 2 or 3, wherein each of the plurality of sector-shaped plates is constructed via layers of fused material.

Example 5 includes the plate assembly of any of Examples 2-4, wherein the plurality of openings are tear-drop shaped.

Example 6 includes the plate assembly of any of Examples 2-5, wherein the plurality of sector-shaped plates are coupled to the support frame via threaded fasteners.

Example 7 includes the plate assembly of Example 6, wherein at least one of the threaded fasteners couples two of the plurality of sector-shaped plates to the support frame.

Example 8 includes the plate assembly of any of Examples 1-7, wherein the plurality of openings are a first plurality of openings, and wherein the support frame has a second plurality of openings having a larger cross-sectional area than the first plurality of openings.

Example 9 includes the plate assembly of Example 8, wherein the support frame has a plurality of rings, and wherein the second plurality of openings are formed by an arrangement of the plurality of radially extending ribs and the plurality of rings.

Example 10 includes the plate assembly of Examples 8 or 9, wherein the first plurality of openings are arranged in groups that align with the second plurality of openings.

Example 11 is a noise attenuator including a body defining a fluid passageway between an inlet and an outlet and a plate assembly coupled to the body. The plate assembly includes a disc-shaped plate disposed in the fluid passageway. The disc-shaped plate has a plurality of openings forming flow paths. The plate assembly also includes a support frame disposed downstream of the disc-shaped plate such that pressure-induced loads on the disc-shaped plate are distributed to the support frame.

Example 12 includes the noise attenuator of Example 11, wherein the plate assembly is coupled to the body at or near the outlet.

Example 13 includes the noise attenuator of Example 12, wherein the support frame has a flange that is configured to be coupled between an outlet flange of the body and an inlet flange of a downstream pipe.

Example 14 includes the noise attenuator of any of Examples 11-13, wherein the disc-shaped plate is formed by a plurality of sector-shaped plates.

Example 15 includes the noise attenuator of Example 14, wherein the plurality of sector-shaped plates are coupled to the support frame.

Example 16 is a method including printing, via a three-dimensional (3D) printer, a plurality of sector-shaped plates. The plurality of sector-shaped plates have a plurality of openings forming flow paths. The plurality of sector-shaped plates, when arranged together, form a disc-shaped plate to be disposed in a fluid body to affect a flow of fluid through the fluid body.

Example 17 includes the method of Example 16, wherein each of the plurality of sector-shaped plates is printed in a vertical orientation.

Example 18 includes the method of Examples 16 or 17, further including coupling the plurality of sector-shaped plates to a support frame. The plurality of sector-shaped plates form the disc-shaped plate when coupled to the support frame.

Example 19 includes the method of Example 18, further including coupling the support frame to the fluid body such that the disc-shaped plate is disposed in a fluid passageway of the fluid body.

Example 20 includes the method of Example 19, further including coupling the support frame to the fluid body such that the support frame is disposed downstream of the disc-shaped plate.

Example 21 is a disc-shaped plate for a noise attenuator. The disc-shaped plate includes a plurality of sector-shaped plates. The plurality of sector-shaped plates have openings defining flow paths. Each of the plurality of sector-shaped plates have a first radial edge forming a first mating feature and a second radial edge forming a second mating feature that is complementary to the first mating feature such that, when the plurality of sector-shaped plates are arranged together, the first mating feature of each of the plurality of sector-shaped plates mates with the second mating feature of an adjacent one of the plurality of sector-shaped plates.

Example 22 includes the disc-shaped plate of Example 21, wherein each of the plurality of sector-shaped plates is the same shape and size.

Example 23 includes the disc-shaped plate of Examples 21 or 22, wherein, when the plurality of sector-shaped plates are arranged together, a portion of each of the plurality of sector-shaped plates overlaps in an axial direction with an adjacent one of the plurality of sector-shaped plates.

Example 24 includes the disc-shaped plate of any of Examples 21-23, wherein each of the plurality of sector-shaped plates is constructed via layers of fused material.

Example 25 includes the disc-shaped plate of any of Examples 21-24, wherein the openings are tear-drop shaped.

Example 26 includes the disc-shaped plate of any of Examples 21-25, wherein the plurality of sector-shaped plates includes a first sector-shaped plate. The first sector-shaped plate includes a first wall forming a first side of the first sector-shaped plate, the first wall having a first plurality of openings, a second wall forming a second side of the first sector-shaped plate, the second wall having a second plurality of openings, and an internal lattice structure between the first wall and the second wall.

Example 27 includes the disc-shaped plate of Example 26, wherein the internal lattice structure forms a third plurality of openings.

Example 28 includes the disc-shaped plate of Example 27, wherein one of the third plurality of openings fluidly connects a first set of the first plurality of openings in the first wall and a second set of the second plurality of openings in the second wall.

Example 29 includes the disc-shaped plate of Examples 27 or 28, wherein the third plurality of openings are diamond shaped.

Example 30 includes the disc-shaped plate of Examples 21-29, wherein the plurality of sector-shaped plates are not coupled by fasteners.

Example 31 is a noise attenuator including a body defining a fluid passageway between an inlet and an outlet and a disc-shaped plate disposed in the fluid passageway. The disc-shaped plate has a plurality of openings forming flow paths for reducing noise of fluid flowing in the fluid passageway. The disc-shaped plate is formed by a plurality of sector-shaped plates having mating features such that, when the plurality of sector-shaped plates are arranged together, a portion of each of the plurality of sector-shaped plates overlaps in an axial direction with an adjacent one of the plurality of sector-shaped plates.

Example 32 includes the noise attenuator of Example 31, wherein the disc-shaped plate is disposed in the fluid passageway at or near the outlet.

Example 33 includes the noise attenuator of Example 32, wherein an outer peripheral region of the disc-shaped plate is configured to be clamped between an outlet flange of the body and an inlet flange of a downstream pipe.

Example 34 includes the noise attenuator of any of Examples 31-33, wherein the plurality of sector-shaped plates are not coupled by fasteners.

Example 35 includes the noise attenuator of any of Examples 31-34, further including additional plates disposed in the fluid passageway upstream of the disc-shaped plate.

Example 36 is a method including printing, via a three-dimensional (3D) printer, a plurality of sector-shaped plates. The plurality of sector-shaped plates have openings defining flow paths. Each of the plurality of sector-shaped plates having a first radial edge forming a first mating feature and a second radial edge forming a second mating feature that is complementary to the first mating feature.

Example 37 includes the method of Example 36, wherein the plurality of sector-shaped plates are printed by the 3D printer during a same print batch.

Example 38 includes the method of Examples 36 or 37, further including assembling the plurality of sector-shaped plates to form a disc-shaped plate.

Example 39 includes the method of Example 38, further including coupling the disc-shaped plate to a fluid body such that the disc-shaped plate is disposed in a fluid passageway of the fluid body.

Example 40 includes the method of Example 39, wherein an outer peripheral region of the disc-shaped plate is clamped between the fluid body and a downstream pipe.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A disc-shaped plate for a noise attenuator, the disc-shaped plate comprising:
    a plurality of sector-shaped plates, the plurality of sector-shaped plates having openings defining flow paths, each of the plurality of sector-shaped plates having a first radial edge forming a first mating feature and a second radial edge forming a second mating feature that is complementary to the first mating feature such that, when the plurality of sector-shaped plates are arranged together, the first mating feature of each of the plurality of sector-shaped plates mates with the second mating feature of an adjacent one of the plurality of sector-shaped plates, and, when the plurality of sector-shaped plates are arranged together, a portion of each of the plurality of sector-shaped plates overlaps in an axial direction with an adjacent one of the plurality of sector-shaped plates.

2. The disc-shaped plate of claim 1, wherein each of the plurality of sector-shaped plates is the same shape and size.

3. The disc-shaped plate of claim 1, wherein each of the plurality of sector-shaped plates is constructed via layers of fused material.

4. The disc-shaped plate of claim 1, wherein the plurality of sector-shaped plates includes a first sector-shaped plate, the first sector-shaped plate including:
a first wall forming a first side of the first sector-shaped plate, the first wall having a first plurality of openings;
a second wall forming a second side of the first sector-shaped plate, the second wall having a second plurality of openings; and
an internal lattice structure between the first wall and the second wall.

5. The disc-shaped plate of claim 1, wherein the plurality of sector-shaped plates are not coupled by fasteners.

6. A disc-shaped plate for a noise attenuator, the disc-shaped plate comprising:
a plurality of sector-shaped plates, the plurality of sector-shaped plates having openings defining flow paths, the openings being tear-drop shaped, each of the plurality of sector-shaped plates having a first radial edge forming a first mating feature and a second radial edge forming a second mating feature that is complementary to the first mating feature such that, when the plurality of sector-shaped plates are arranged together, the first mating feature of each of the plurality of sector-shaped plates mates with the second mating feature of an adjacent one of the plurality of sector-shaped plates.

7. A disc-shaped plate for a noise attenuator, the disc-shaped plate comprising:
a plurality of sector-shaped plates, the plurality of sector-shaped plates having openings defining flow paths, each of the plurality of sector-shaped plates having a first radial edge forming a first mating feature and a second radial edge forming a second mating feature that is complementary to the first mating feature such that, when the plurality of sector-shaped plates are arranged together, the first mating feature of each of the plurality of sector-shaped plates mates with the second mating feature of an adjacent one of the plurality of sector-shaped plates, wherein the plurality of sector-shaped plates includes a first sector-shaped plate, the first sector-shaped plate including:
a first wall forming a first side of the first sector-shaped plate, the first wall having a first plurality of openings;
a second wall forming a second side of the first sector-shaped plate, the second wall having a second plurality of openings; and
an internal lattice structure between the first wall and the second wall, wherein the internal lattice structure forms a third plurality of openings.

8. The disc-shaped plate of claim 7, wherein one of the third plurality of openings fluidly connects a first set of the first plurality of openings in the first wall and a second set of the second plurality of openings in the second wall.

9. The disc-shaped plate of claim 7, wherein the third plurality of openings are diamond shaped.

10. A noise attenuator comprising:
a body defining a fluid passageway between an inlet and an outlet; and
a disc-shaped plate disposed in the fluid passageway, the disc-shaped plate having a plurality of openings forming flow paths for reducing noise of fluid flowing in the fluid passageway, the disc-shaped plate formed by a plurality of sector-shaped plates having mating features such that, when the plurality of sector-shaped plates are arranged together, a portion of each of the plurality of sector-shaped plates overlaps in an axial direction with an adjacent one of the plurality of sector-shaped plates.

11. The noise attenuator of claim 10, wherein the disc-shaped plate is disposed in the fluid passageway at or near the outlet.

12. The noise attenuator of claim 11, wherein an outer peripheral region of the disc-shaped plate is configured to be clamped between an outlet flange of the body and an inlet flange of a downstream pipe.

13. The noise attenuator of claim 10, wherein the plurality of sector-shaped plates are not coupled by fasteners.

14. The noise attenuator of claim 10, further including additional plates disposed in the fluid passageway upstream of the disc-shaped plate.

15. The noise attenuator of claim 10, wherein the openings are tear-drop shaped.

16. A method comprising:
printing, via a three-dimensional (3D) printer, a plurality of sector-shaped plates, the plurality of sector-shaped plates having openings defining flow paths, each of the plurality of sector-shaped plates having a first radial edge forming a first mating feature and a second radial edge forming a second mating feature that is complementary to the first mating feature such that, when the plurality of sector-shaped plates are arranged together, the first mating feature of each of the plurality of sector-shaped plates mates with the second mating feature of an adjacent one of the plurality of sector-shaped plates, and, when the plurality of sector-shaped plates are arranged together, a portion of each of the plurality of sector-shaped plates overlaps in an axial direction with an adjacent one of the plurality of sector-shaped plates.

17. The method of claim 16, wherein the plurality of sector-shaped plates are printed by the 3D printer during a same print batch.

18. The method of claim 16, further including assembling the plurality of sector-shaped plates to form a disc-shaped plate.

19. The method of claim 18, further including coupling the disc-shaped plate to a fluid body such that the disc-shaped plate is disposed in a fluid passageway of the fluid body.

20. The method of claim 19, wherein an outer peripheral region of the disc-shaped plate is clamped between the fluid body and a downstream pipe.

* * * * *